(12) United States Patent
Peterson et al.

(10) Patent No.: US 7,777,949 B2
(45) Date of Patent: *Aug. 17, 2010

(54) LAMINATE SCREEN FOR A DISPLAY DEVICE

(75) Inventors: Mark David Peterson, Lake Oswego, OR (US); Jeffrey Alan Gohman, Hillsboro, OR (US)

(73) Assignee: Seiko Epson Corporation, Shinjuku-ku, Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 11/462,976

(22) Filed: Aug. 7, 2006

(65) Prior Publication Data

US 2007/0014005 A1    Jan. 18, 2007

Related U.S. Application Data

(63) Continuation-in-part of application No. 10/753,965, filed on Jan. 6, 2004, now Pat. No. 7,088,509, which is a continuation-in-part of application No. 10/693,615, filed on Oct. 23, 2003, now Pat. No. 7,088,507, which is a continuation-in-part of application No. 10/222,083, filed on Aug. 16, 2002, now Pat. No. 6,896,375.

(51) Int. Cl.
*G03B 21/60* (2006.01)
*G03B 21/56* (2006.01)
*G03B 21/06* (2006.01)
*G03B 21/28* (2006.01)

(52) U.S. Cl. ............... 359/455; 359/449; 359/459; 359/460; 353/66; 353/77

(58) Field of Classification Search .............. 359/449, 359/454–457, 459–460; 353/66, 77–78
See application file for complete search history.

(56) References Cited

U.S. PATENT DOCUMENTS 4,674,836 A     6/1987  Yata et al.

(Continued)

FOREIGN PATENT DOCUMENTS

GB     2 367 905 A     4/2002

(Continued)

OTHER PUBLICATIONS

H. Kanayama, et al., "A New LC Rear-Projection Display Based on the Aspherical Mirror Projection System," IDW, 2000, pp. 1041-1044, Sanyo Electric Co., Ltd., Osaka Japan.

(Continued)

*Primary Examiner*—Georgia Y Epps
*Assistant Examiner*—Magda Cruz
(74) *Attorney, Agent, or Firm*—Townsend and Townsend and Crew, LLP

(57) ABSTRACT

A rear projection display device is provided. In an embodiment, the display device includes a laminate screen including a microstructure lamina having a non-planar input surface, a substantially planar output surface and a first index of refraction. The laminate screen further may include a diffusion screen lamina having a substantially planar input surface, an output surface and a second index of refraction. The diffusion screen lamina may be in optical communication with the microstructure lamina. Moreover, the planar output surface of the microstructure lamina and the planar input surface of the diffusion screen lamina may be in facing relationship.

22 Claims, 20 Drawing Sheets

U.S. PATENT DOCUMENTS

| | | |
|---|---|---|
| 4,729,631 A | 3/1988 | Takahashi et al. |
| 4,773,731 A | 9/1988 | Goldenberg et al. |
| 4,880,292 A | 11/1989 | Kageyama et al. |
| 4,936,657 A | 6/1990 | Tejima et al. |
| 4,979,801 A | 12/1990 | Park |
| 5,100,222 A | 3/1992 | Minoura et al. |
| 5,302,983 A | 4/1994 | Sato et al. |
| 5,422,691 A | 6/1995 | Ninomiya et al. |
| 5,442,413 A | 8/1995 | Tejima et al. |
| 5,442,484 A | 8/1995 | Shikawa |
| 5,489,940 A | 2/1996 | Richardson et al. |
| 5,495,306 A | 2/1996 | Shibazaki |
| 5,710,668 A | 1/1998 | Gohman et al. |
| 5,716,118 A | 2/1998 | Sato et al. |
| 5,724,195 A | 3/1998 | Enomoto et al. |
| 5,760,973 A | 6/1998 | Kawamura |
| 5,796,528 A | 8/1998 | Mihara |
| 5,805,359 A | 9/1998 | Yamanashi |
| 5,820,240 A | 10/1998 | Ohzawa |
| 5,833,339 A | 11/1998 | Sarayeddine |
| 5,870,234 A | 2/1999 | Ebbesmeier nee Schitthof |
| 5,923,479 A | 7/1999 | Nagata |
| 5,978,051 A | 11/1999 | Gohman et al. |
| 5,999,332 A | 12/1999 | Ohno |
| 6,016,229 A | 1/2000 | Suzuki |
| 6,018,425 A | 1/2000 | Nakabayashi et al. |
| 6,038,085 A | 3/2000 | Nakazawa |
| 6,046,859 A | 4/2000 | Raj |
| 6,053,615 A | 4/2000 | Peterson et al. |
| 6,081,380 A | 6/2000 | Ohshima et al. |
| 6,088,172 A | 7/2000 | Sato |
| 6,111,701 A | 8/2000 | Brown |
| 6,123,425 A | 9/2000 | Ohzawa |
| 6,137,638 A | 10/2000 | Yamagishi et al. |
| 6,147,812 A | 11/2000 | Narimatsu et al. |
| 6,201,647 B1 | 3/2001 | Ohzawa |
| 6,236,511 B1 | 5/2001 | Brown |
| 6,273,338 B1 | 8/2001 | White |
| 6,299,313 B1 | 10/2001 | Hirata et al. |
| 6,301,058 B2 | 10/2001 | Nagahara |
| 6,353,509 B1 | 3/2002 | Nakazawa |
| 6,366,400 B1 | 4/2002 | Ohzawa |
| 6,384,987 B1 | 5/2002 | Sensui |
| 6,396,641 B2 | 5/2002 | Hirata et al. |
| 6,400,504 B2 | 6/2002 | Miyata |
| 6,406,150 B1 | 6/2002 | Burstyn |
| 6,407,860 B1 | 6/2002 | Funazaki et al. |
| 6,419,365 B1 | 7/2002 | Potekev et al. |
| 6,513,935 B2 | 2/2003 | Ogawa |
| 6,561,649 B1 | 5/2003 | Burstyn |
| 6,726,859 B2 | 4/2004 | Suzuki et al. |
| 6,768,594 B2 | 7/2004 | Imafuku et al. |
| 6,804,055 B2 | 10/2004 | Peterson et al. |
| 6,808,271 B1 | 10/2004 | Kurematsu |
| 7,088,509 B2 * | 8/2006 | Peterson et al. ............. 359/457 |
| 7,116,476 B2 | 10/2006 | Suzuki |
| 2001/0050758 A1 | 12/2001 | Suzuki et al. |
| 2002/0008853 A1 | 1/2002 | Sunaga |
| 2002/0044263 A1 | 4/2002 | Takeuchi |
| 2003/0025885 A1 | 2/2003 | Cotton et al. |
| 2003/0231261 A1 | 12/2003 | Bassi et al. |
| 2004/0001254 A1 | 1/2004 | Shimizu |

FOREIGN PATENT DOCUMENTS

| | | |
|---|---|---|
| JP | 04-195030 A | 7/1992 |
| JP | 05-100312 A | 4/1993 |
| JP | 5119283 | 5/1993 |
| JP | 05-158151 A | 6/1993 |
| JP | 2002-122807 A | 4/2002 |
| JP | 2002-196413 A | 7/2002 |
| WO | WO02-27399 A | 4/2002 |

OTHER PUBLICATIONS

J. Ouellette, "Digital Displays with Micromirror Devices," The Industrial Physicist, American Institute of Physics, Jun. 1997, pp. 9-11.

J. Shinozaki, et al. "15.3: A 50-in. Ultra-Slim Liquid-Crystal Rear Projector," SID 92 Digest, 1992, pp. 273-276, Seiko Epson Corp., Tokyo, Japan.

* cited by examiner

LAMINATE SCREEN FOR A DISPLAY DEVICE

RELATED APPLICATIONS

The present U.S. Patent application is a continuation-in-part of, and claims the benefit of priority under 35 U.S.C §120 to, U.S. patent application Ser. No. 10/753,965, entitled, "Laminate Screen for a Display Device" filed Jan. 6, 2004, now U.S. Pat. No. 7,088,509 issued Aug. 8, 2006, which is a continuation-in-part of U.S. patent application Ser. No. 10/693,615, entitled, "Rear Projection Display," filed on Oct. 23, 2003, now U.S. Pat. No. 7,088,507 which is a continuation-in-part application of U.S. patent application Ser. No. 10/222,083 filed Aug. 16, 2002, now U.S. Pat. No. 6,896,375 issued May 24, 2005, all of which are incorporated by reference herein for all purposes.

BACKGROUND

In order to provide a television with a screen size greater than approximately 40 inches a display device other than a direct view cathode ray tube (CRT) is typically used. As the screen size of a CRT increases, so too does the depth. It is generally accepted that for screen sizes greater than 40 inches direct view CRTs are no longer practical. Three alternatives exist for large screen (>40 inch screen size) displays: projection displays, plasma displays, and Liquid Crystal Displays (LCDs).

Current plasma and LCD displays are much more expensive than projection displays. Plasma and LCD displays are generally thin enough to mount on a wall, but can be heavy enough that mounting can be difficult. For example, current 42-inch plasma displays can weigh 80 pounds or more and 60-inch plasma displays can weigh 150 pounds or more. One advantage of plasma and LCD displays over current projection displays is that they are typically much thinner than current projection displays having the same screen size.

Projection displays, specifically rear projection displays, are typically more cost-effective than plasma displays. Projection displays may also consume too much space in a room to provide a practical solution for large screen needs. For example, typical 60-inch rear projection displays are 24 inches thick and can weigh 200 to 300 pounds.

FIG. 1 illustrates a prior art rear projection display device. In general, display device 100 includes optical engine 140, projection lens 130, back plate mirror 120 and screen 110. Optical engine 140 generates an image to be projected on screen 110. Projection lens 130 projects the image from optical engine 140 on to back plate mirror 120, which reflects the image to screen 110. The size of display device 100 is proportional to the size of the image to be displayed on screen 110. Thus, for large screen sizes (e.g., >60 inches), the overall size of display device 100 can be very large.

Fresnel lenses may be used to direct a projected image toward a viewer. Conventional rear projection display devices are thick because of surface reflections from the Fresnel surface. As the angle of incidence increases (on the flat side of the Fresnel) the amount of light that is reflected from the air-plastic interface also increases, reducing image uniformity. A person of ordinary skill in the art is familiar with calculating Fresnel surface reflections.

FIG. 2 illustrates a conventional rear projection display device 200 that is implemented with a Fresnel lens. Conventional rear projection display device 200 includes: optical engine 210, projection lens 220, Fresnel lens 230, and diffusion screen 240. The light impinging on the transmission surface of Fresnel lens 230 is roughly symmetric with respect to optical axis 250. A shortcoming of rear projection display device 200 is that the grooves of Fresnel lens 230 are on the output side of Fresnel lens 230. It is not possible to bond diffusion screen 240 to Fresnel lens 230 because the grooves are facing diffusion screen 240.

SUMMARY

A rear projection display device is provided. In an embodiment, the display device includes a laminate screen including a microstructure lamina having a non-planar input surface, a substantially planar output surface and a first index of refraction. The laminate screen further may include a diffusion screen lamina having a substantially planar input surface, an output surface and a second index of refraction. The diffusion screen lamina may be in optical communication with the microstructure lamina. Moreover, the planar output surface of the microstructure lamina and the planar input surface of the diffusion screen lamina may be in facing relationship.

BRIEF DESCRIPTION OF THE DRAWINGS

The invention is illustrated by way of example, and not by way of limitation, in the figures of the accompanying drawings in which like reference numerals refer to similar elements.

DETAILED DESCRIPTION

An ultra-thin rear projection display system is described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The ultra-thin rear projection display device described herein includes a wide-angle lens system and one or more planar mirrors that are parallel to a screen on which an image is to be displayed. In one embodiment, the screen that has multiple groove angles to provide better illumination than screens with a single groove angle.

As described in greater detail below, the screen can be a Fresnel lens having one or more groove angles. However, many other objects can operate as a screen for purposes of displaying an image. In general, any object that diffuses light can be used as a screen. For example, a wall, water or fog can be used as a screen. Additionally, instead of a Fresnel lens the screen may comprise a combination of microstructures that may have some optical power such as to bend or focus the light passing through the screen. A microstructure is a small structure in relation to an overall screen or lamina, and may receive light beams from different angles and focus the light beams on a small spot. In some embodiments there may be more than one type of microstructure.

Figure 1:
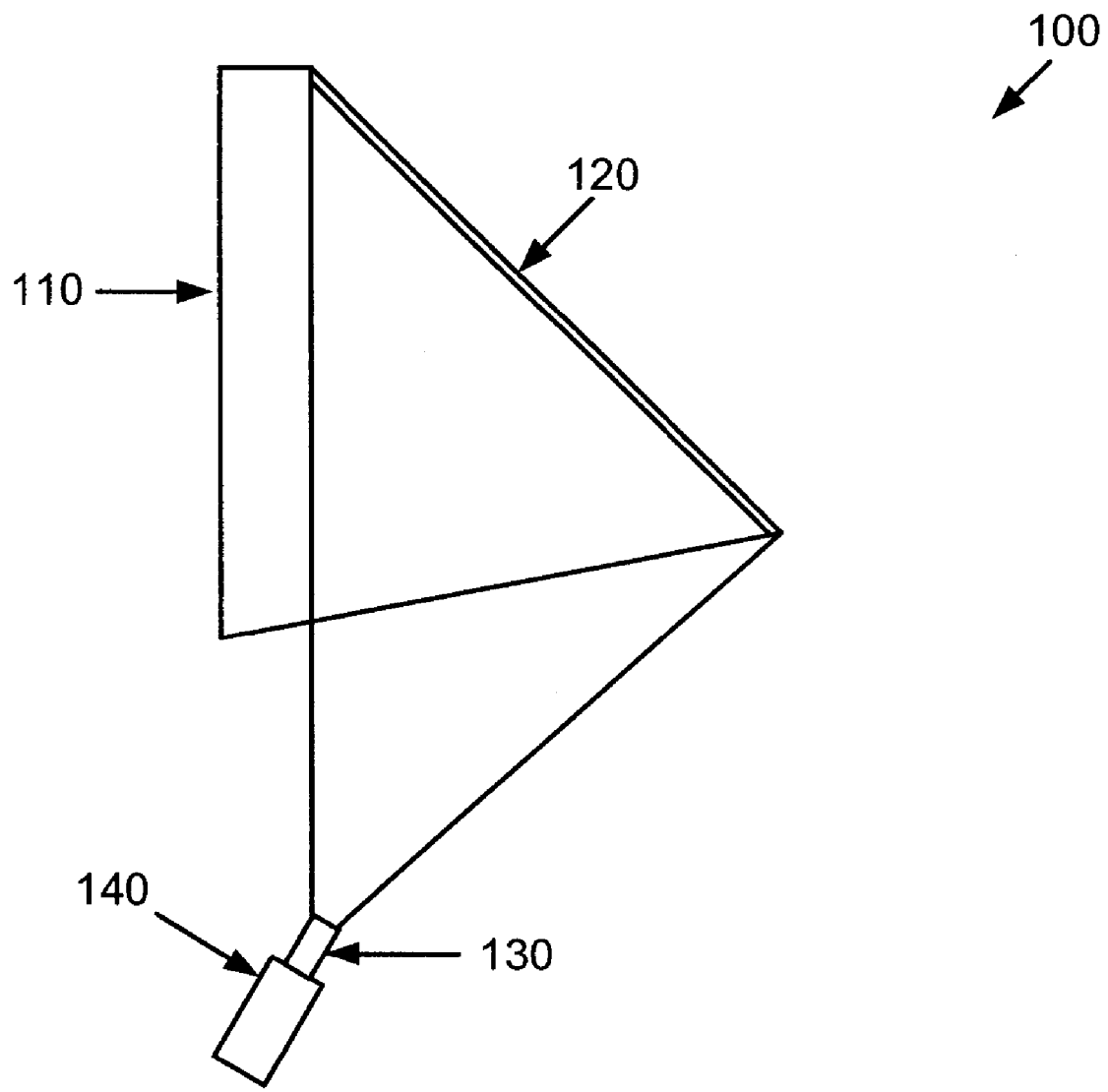
FIG. 1 illustrates a prior art rear projection display device.
Figure 2:
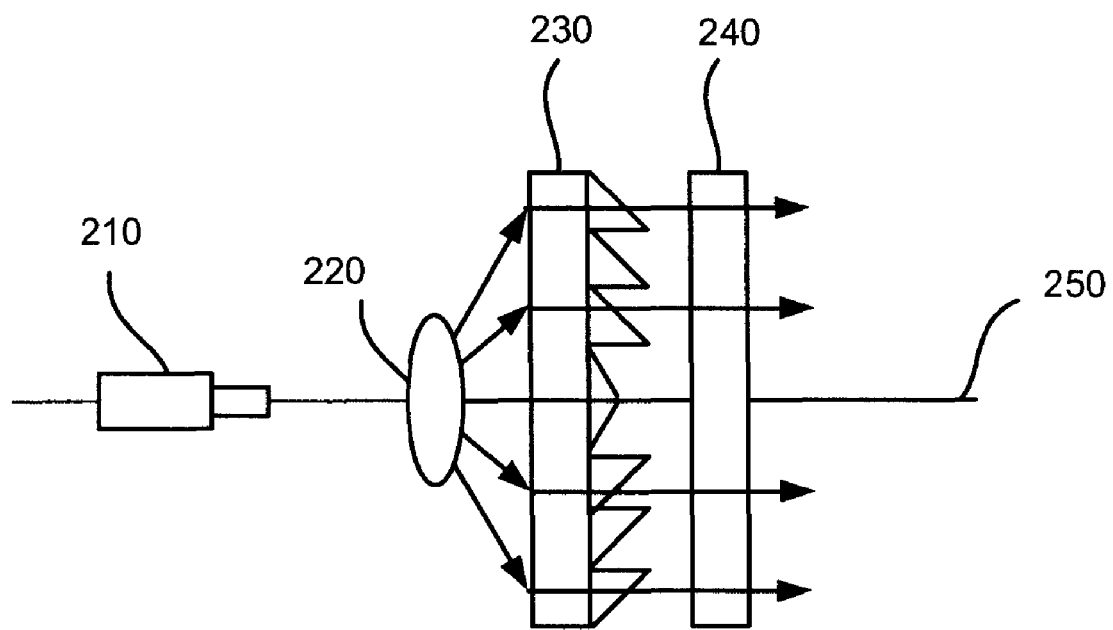
FIG. 2 illustrates a conventional rear projection display device 200 that is implemented with a Fresnel lens.
Figure 3:
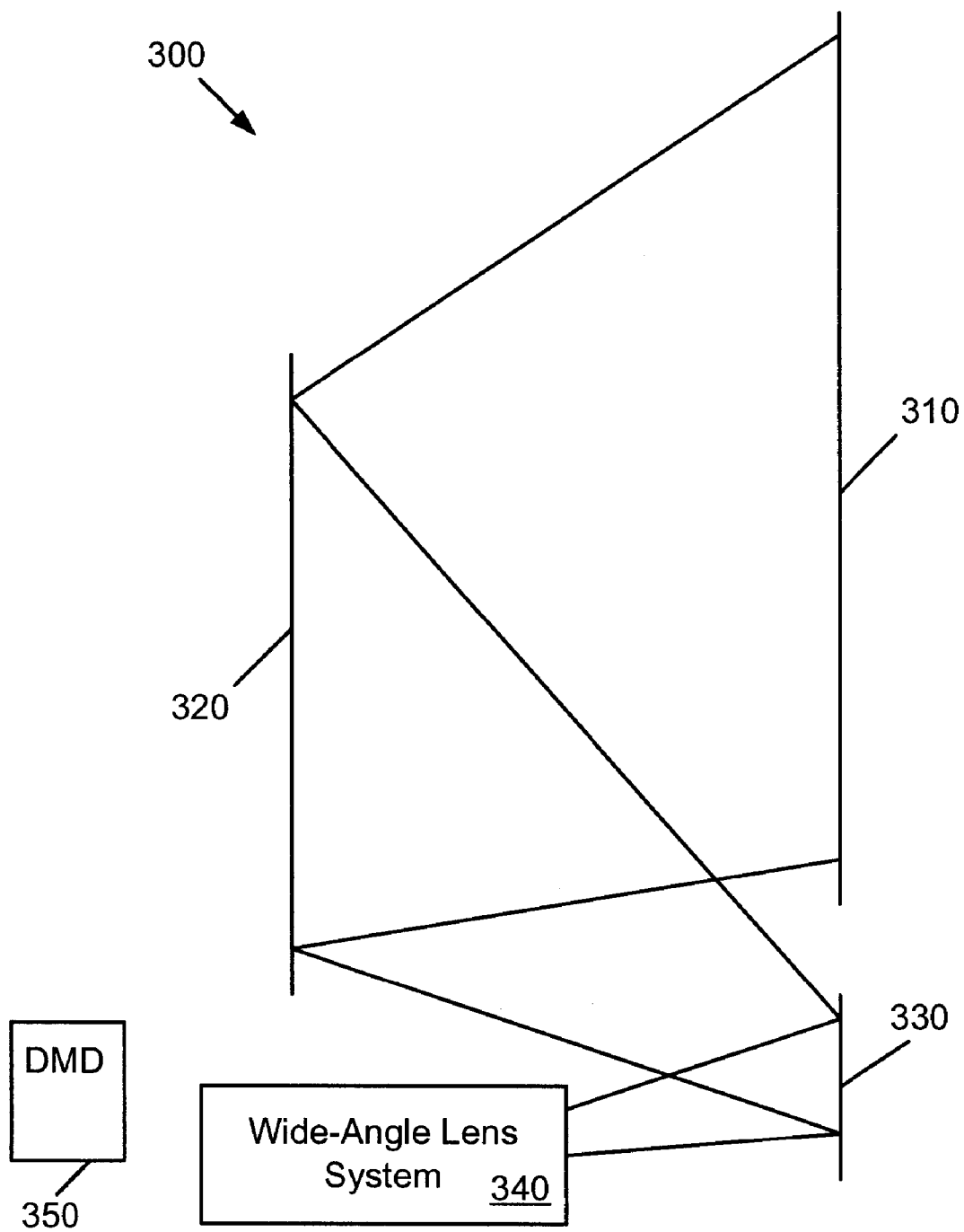
FIG. 3 illustrates one embodiment of an ultra-thin rear projection display device with planar mirrors parallel to a screen.

FIG. 3 illustrates one embodiment of an ultra-thin rear projection display device with planar mirrors parallel to a screen. As described in greater detail below, use of planar mirrors parallel to the screen as well as a wide angle projection lens having an optic axis that is perpendicular to the mirrors and the screen allows the ultra-thin rear projection display device to be thinner and simpler than prior art rear projection display devices. For example, an ultra-thin rear projection display device as described herein that is less than 7 inches thick can provide a 60-inch image.

In one embodiment, ultra-thin rear projection display device 300 includes screen 310, back plate mirror 320, intermediate mirror 330, lens system 340 and digital micromirror device (DMD) 350. Other components, for example, image generating components are not illustrated for reasons of simplicity of description. An image can be provided to DMD 350 in any manner known in the art. DMD 350 selectively reflects light from a light source (not shown in FIG. 3) to lens system 340. Any type of display device known in the art can be used in display device 300. Other types of devices (e.g., microelectromechanical systems (MEMS), grating light valve (GLV), liquid crystal display (LCD), liquid crystal on silicon (LCOS)) can be used to provide an image to lens system 340. In one embodiment, the mirrors are substantially parallel to the screen, which implies an alignment error of +/−10°. In one embodiment, the optic axis of the wide-angle lens system is substantially perpendicular to the screen, which also implies an alignment error of +/−10°

In one embodiment, DMD 350 is offset from the optic axis of lens system 340 such that only a portion (e.g., 50%, 60%, 40%) of the available lens field is used. The image from DMD 350 is projected by lens system 340 in the upper portion of the lens field to intermediate mirror 330, in an embodiment of the invention. The image is then reflected to back plate mirror 320 and finally to screen 310.

In an alternative embodiment of the invention, the image from DMD 350 is projected by lens system 340 in the lower portion of the lens field to intermediate mirror 330. In such an embodiment, wide-angle lens system 340 may be, at least partly, above intermediate mirror 330. Intermediate mirror 330, in turn, may be, at least partly above back plate mirror 320. The image is then reflected to back plate mirror 320 and finally to screen 310.

In order to project an image as described, lens system 340 is a very wide-angle lens system. In one embodiment, lens system 340 has a field angle of 152° or more; however, other lenses can be used. In general, the wider the angle of lens system 340, the thinner display device 300 can be made. Description of a suitable wide-angle lens system is described in the above-referenced patent application, which is incorporated by reference.

Intermediate mirror 330 reflects the image to back plate mirror 320, which reflects the image to screen 310. In one embodiment, screen 310 is a Fresnel lens. In another embodiment screen may comprise microstructures that bend or focus light instead of the Fresnel lens. Back plate mirror 320 is also a planar mirror and is parallel to screen 310 and perpendicular to the optic axis of lens system 340. Because the optic axis of lens system 340 is perpendicular to intermediate mirror 330 and both intermediate mirror 330 and back plate mirror 320 are planar and parallel to screen 310, the distortion caused by angled lenses and aspherical mirrors is absent in display device 300. This simplifies the design of display device 300 and reduces the cost and complexity of manufacturing.

Figure 4:
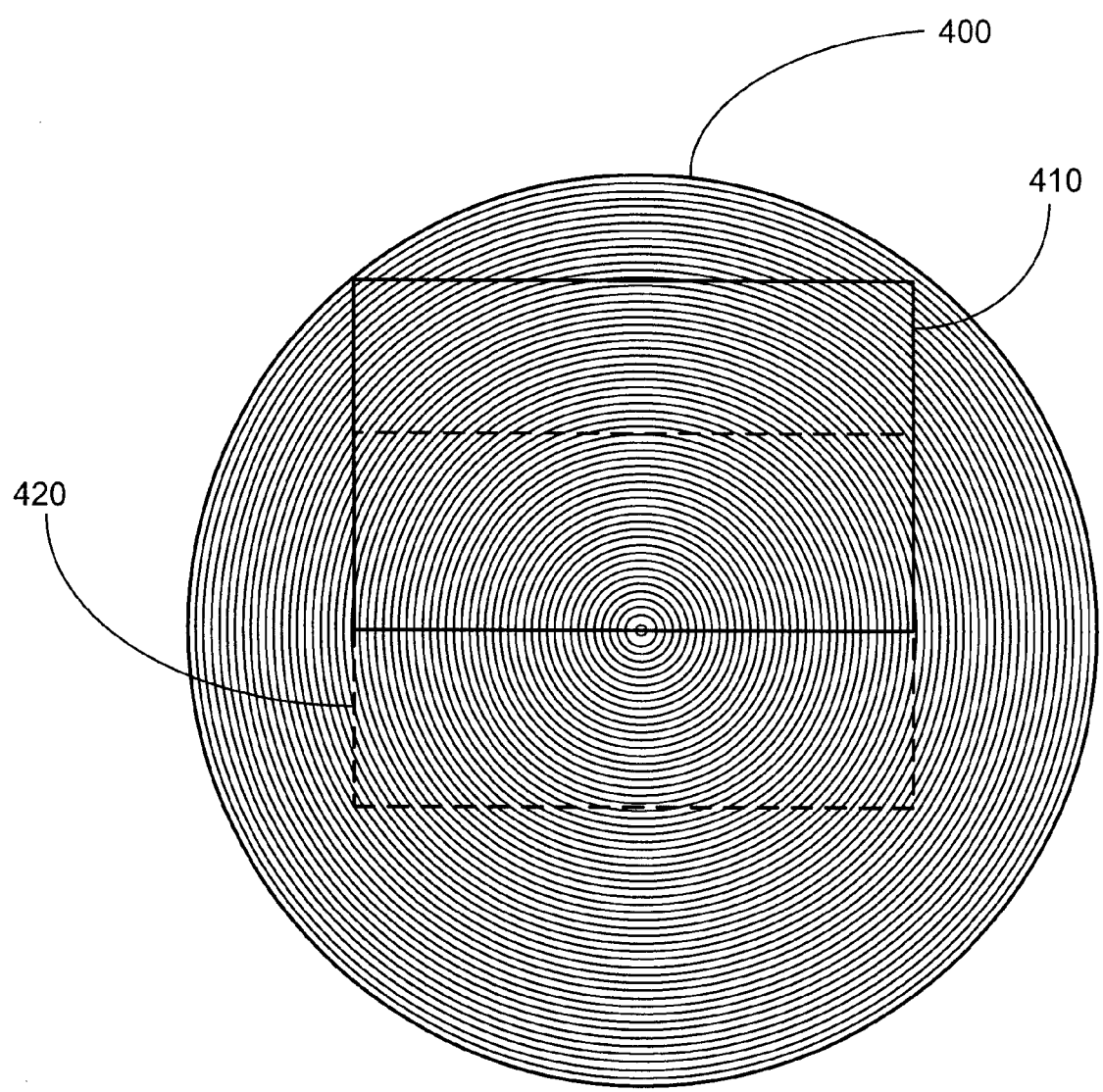
FIG. 4 illustrates a Fresnel lens with outlines of sections to be used for rear projection screens.

FIG. 4 illustrates a Fresnel lens with outlines of sections to be used for rear projection screens. Additionally, the ring arrangement in FIG. 4 may also be used with microstructures and lens configurations other than a Fresnel lens. FIG. 4 provides a conceptual illustration of the sections of a Fresnel lens that can be used for various rear projection display devices. The Fresnel lens can be described with two angles. The face angle is defined as the angle of the surface of each individual groove through which light passes as it enters, or in the case of some refractive designs exits the Fresnel lens relative to the optic axis of the lens. The groove angle is the angle formed between the input face and the reflection face, or in the case of a refractive lens between the optical face of the groove and the non-optical face. Face angles and groove angles are more fully discussed below with reference to FIG. 16.

In one embodiment, Fresnel lens 400 can have many concentric grooves having one or more predetermined groove angles. Techniques for manufacturing and using Fresnel lenses having a single groove angle are known in the art. In a rear projection display device in which the full lens field of the projection lens system is used, a center portion 420 of Fresnel lens 400 is used for the lens of the display device.

Dashed rectangle 420 provides an indication of a screen from the center portion of Fresnel lens 400. The size and shape of the portion of the lens to be used corresponds to the size and shape of the screen of the display device. For traditional rear projection displays, the center of section 420 to be used for a screen is the center of Fresnel lens 420.

When using an offset DMD (or other device) so that only a portion of the projection lens field is used, the section of Fresnel lens 400 used for a screen is correspondingly offset from the center of Fresnel lens 400. For example, if the top half of the projection lens field is used, the bottom edge of screen portion 410 passes through the center of Fresnel lens 400.

Figure 5:
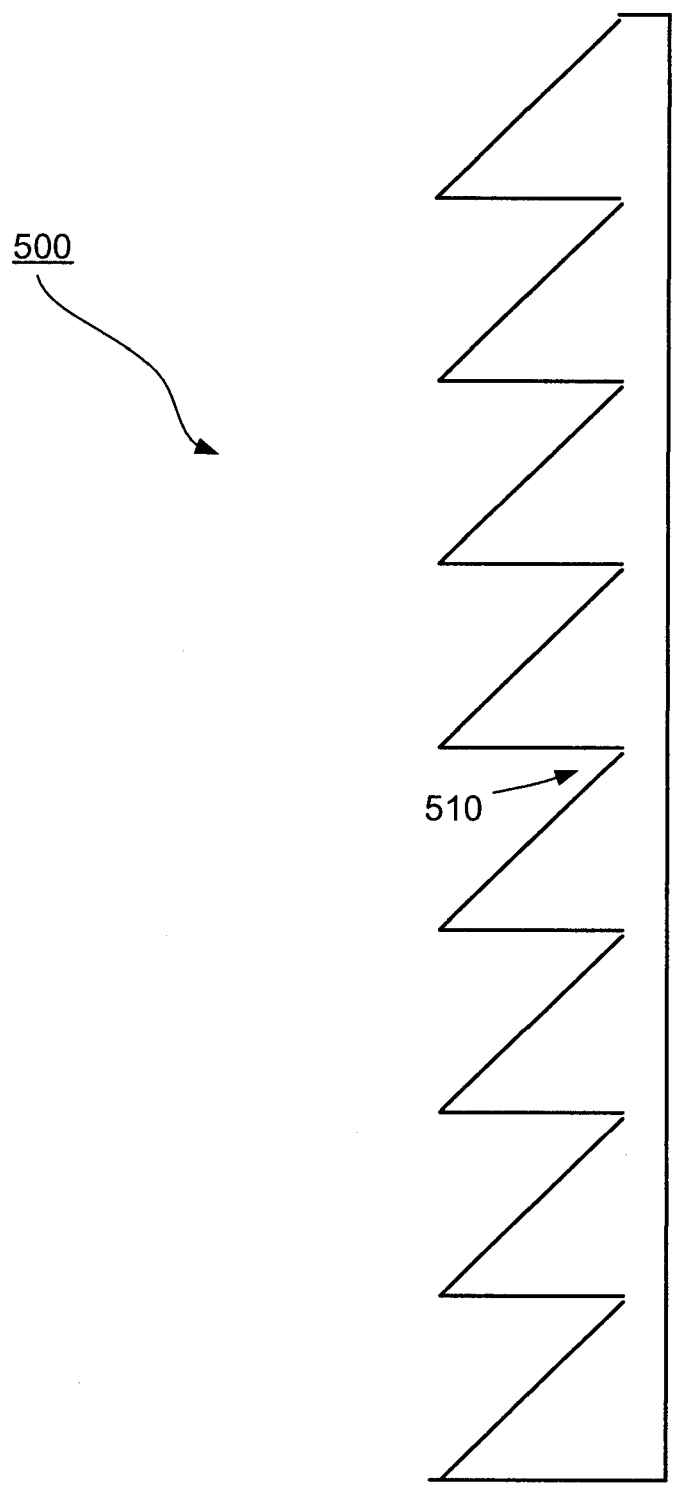
FIG. 5 illustrates a cross-sectional profile view of a Fresnel lens having a groove angle of 39°.

FIG. 5 illustrates a cross-sectional profile view of a Fresnel lens 500 having a groove angle 510 of 39°. The lens of FIG. 5 can be used with, for example, the display system of FIG. 3. When used with a display system as illustrated in FIG. 3 with an offset as described with respect to FIG. 4, the groove angle of 39° provides a balance between diamond cutter structural integrity and lens performance.

As the groove angle increases the image projected to the bottom center of lens 500 becomes dark because rays pass through the lens without being reflected from the intended total internal reflection (TIR) surface on the exterior of the groove. As the groove angle decreases, the image projected to the top corners of lens 500 become dark because reflected rays are directed down and away from the viewer. Also, as the groove angle decreases, the tool used to manufacture lens 500 can become too weak to work effectively.

Figure 6A:
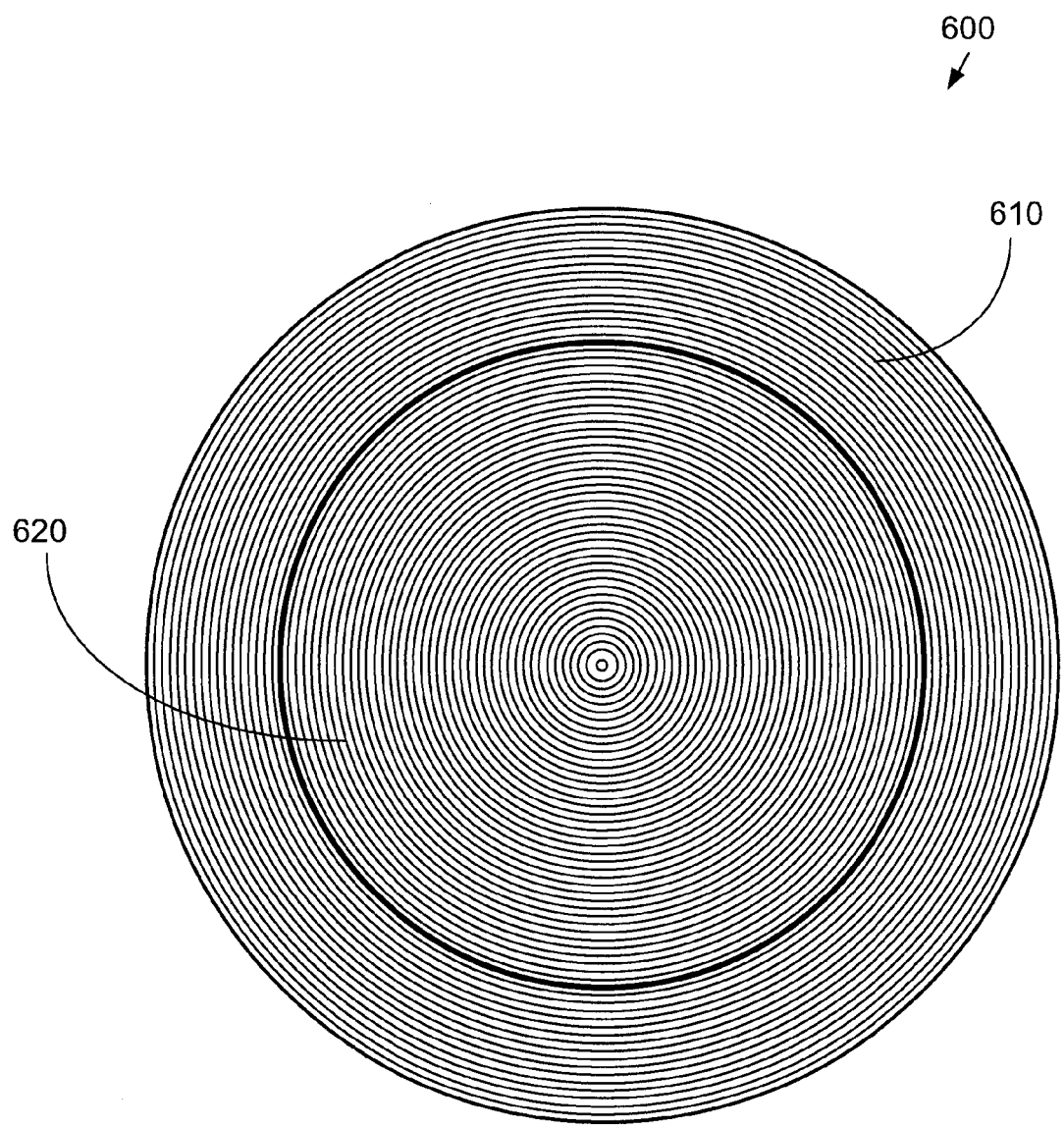
FIG. 6a illustrates a front view of a Fresnel lens having two zones each having a different groove angle.

FIG. 6a illustrates a front view of a Fresnel lens having two zones each having a different groove angle. The embodiment of FIG. 6a illustrates two zones with two groove angles; however, any number of zones with corresponding groove angles can be used. The groove angle of a lens can vary continuously. Also, while the example of FIG. 6a illustrates circular regions, other shapes can also be used.

In one embodiment, interior region 620 has grooves of approximately 35°; however, other groove angles can also be used. When used for large screens, a Fresnel lens with a single groove angle throughout provides non-uniform illumination. In one embodiment, outer region 610 has grooves of approximately 41°; however, other groove angles can also be used. In alternate embodiments, interior region 620 and outer region 610 can provide any combination of refraction and/or reflection lenses. In one embodiment, the projector side of lens 600 has grooves and the viewer side is planar. In an alternate embodiment, lens 600 has grooves on both sides.

Figure 6B:
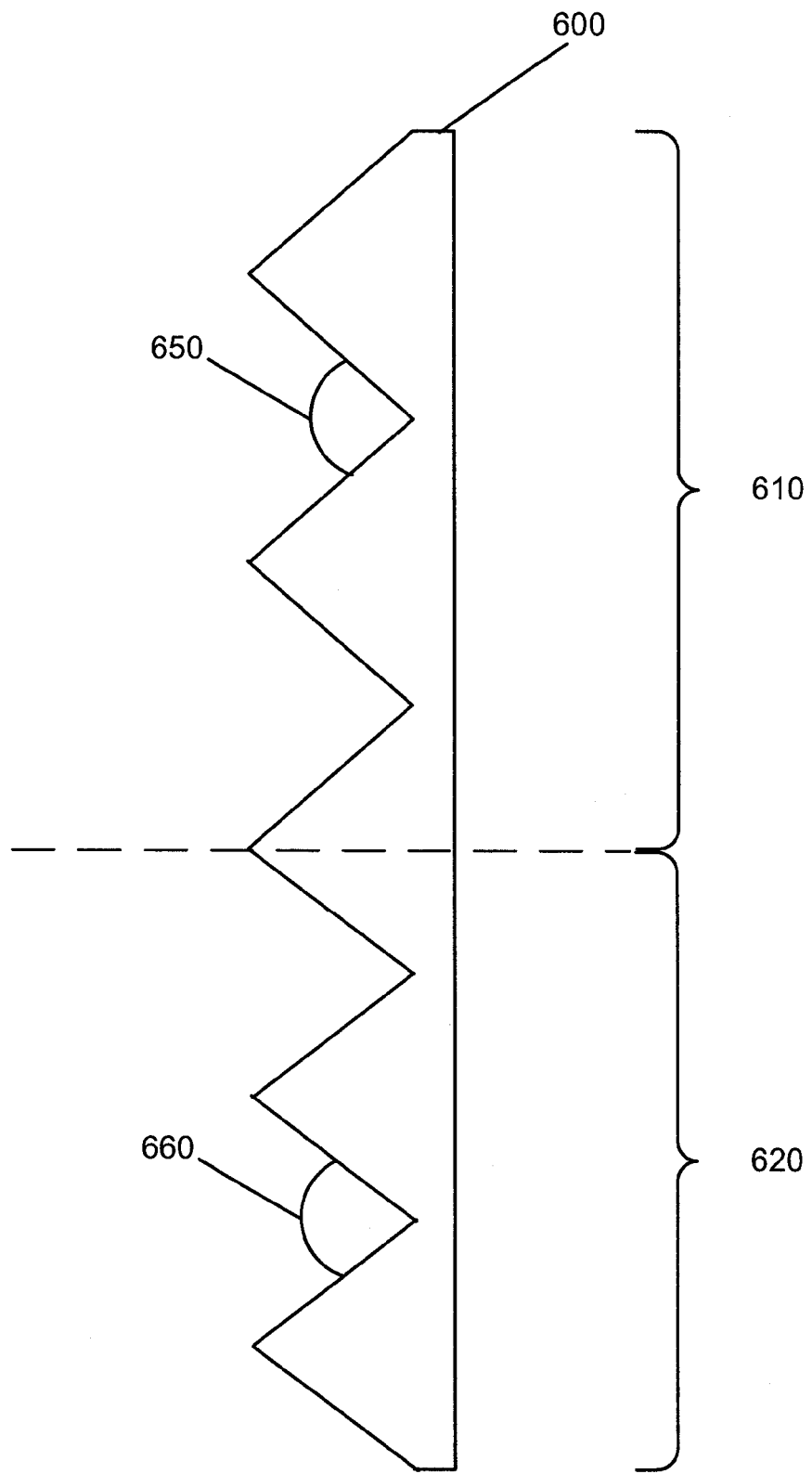
FIG. 6b illustrates a cross-sectional profile view of a two-zone Fresnel lens having a first zone with a groove angle of 35° and a second zone having a groove angle of 41°.

FIG. 6b illustrates a cross-sectional profile view of a two-zone Fresnel lens having a first zone with a groove angle of 35° and a second zone having a groove angle of 41°. The lens of FIG. 6b can be used with, for example, the display system of FIG. 3. The lens of FIG. 6b provides improved uniformity as compared to the lens of FIG. 5. Other embodiments may use microstructures other than a Fresnel lens in a similar multiple zone fashion as illustrated in FIG. 6b. Additionally, the microstructures need not be arranged in a concentric circular fashion but may be arranged in a grid pattern, as an example.

In one embodiment, the grooves of zone 620 provide a refractive lens and the grooves of zone 610 provide a total internal reflection (TIR) lens. The refractive and reflective zones of lens 600 can be on the same side of the lens (e.g., the projector side) or the refractive and reflective zones of lens 600 can be on opposite sides (e.g., reflective on the projector side and refractive on the viewer side). An example of an embodiment of the invention wherein the refractive and reflective zones of a lens are on opposite sides is described below with reference to FIG. 10. As described in greater detail below, transition regions can be used to reduce or even eliminate image artifacts caused by transitions between zones. For a double-sided lens, two single-sided lenses can be aligned and the planar sides of each lens can be bonded together. Alternatively, one side of the lens can be manufactured, for example, by a curing process and additional grooves can be formed directly on the opposite side of the lens by the same process.

Figure 7:
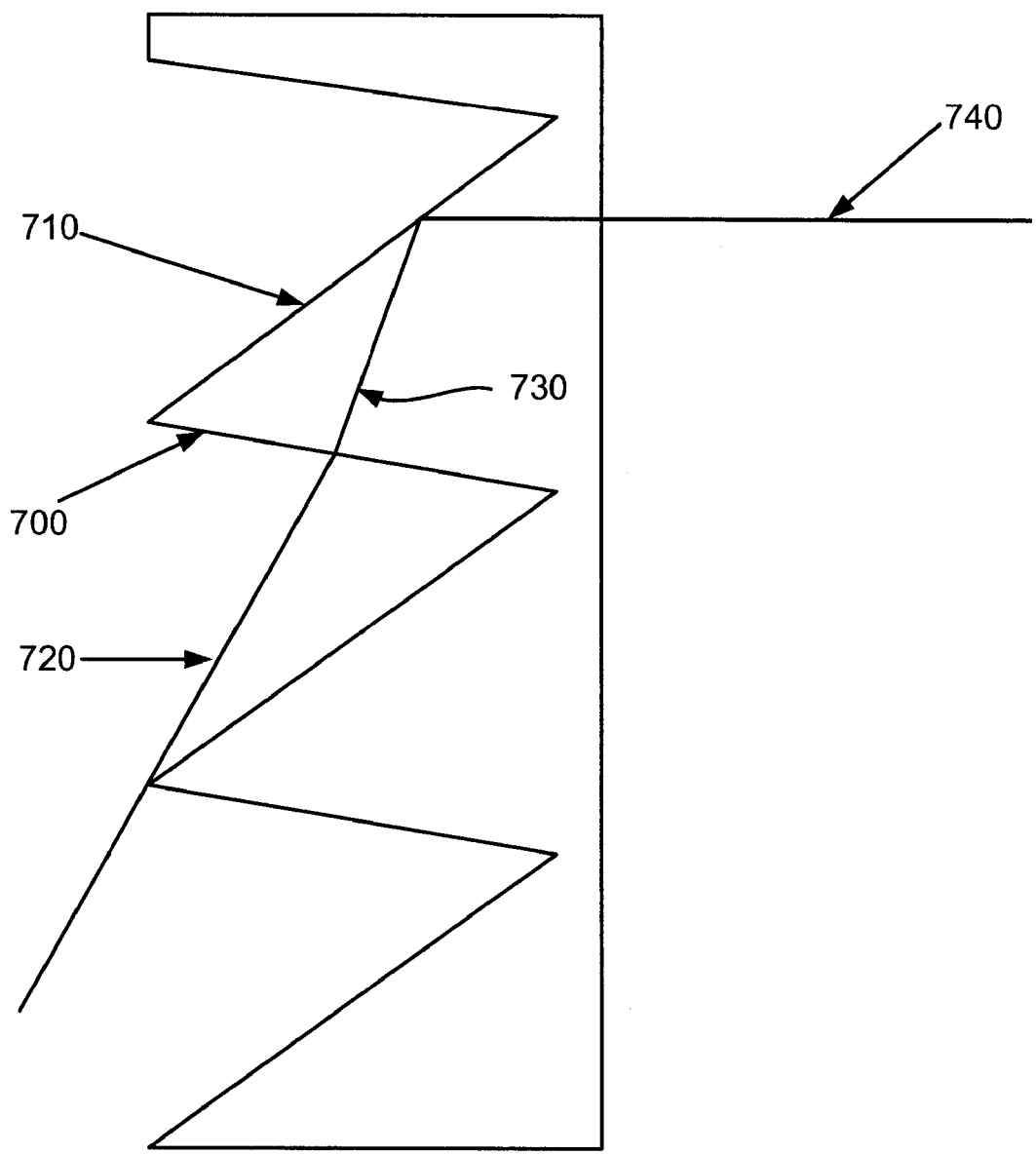
FIG. 7 illustrates an input ray having a 60° input angle with a Fresnel lens having a face angle of 10°.

FIG. 7 illustrates an input ray having a 60° input angle with a Fresnel lens having a face angle of 10°. For steep angles of input light (e.g., greater than about 45°) it is possible to design face angles of the grooves such that all light enters the Fresnel lens and reflects off of reflection face and travels directly toward the viewer. For example, input light 720 passes through groove face 700 and is slightly refracted. Refracted light 730 is reflected by reflection face 710 toward a viewer (not shown in FIG. 7). For most applications, reflected light 740 is directed toward the viewer.

As the angle of the input light decreases, there is an angle at which the refracted light misses reflection face 710. This occurs, for example, at the bottom center of the screen at the grooves closest to the Fresnel center. This light is lost and travels through the Fresnel structure creating either a ghost image or a reduction in contrast. The lost light reduces contrast at the bottom center of the screen area (and possibly everywhere depending on where the mirrors are with respect to the screen).

One technique to reduce ghost rays and improve contrast in these areas is to change the reflection face angle such that, instead of directing light toward the viewer, the lens is designed to collect as much light as possible. As a consequence, the reflected light ray 740 travels downward. This improves the contrast of the displayed image, but the downward light does not get redirected to viewer as well and appears dark.

The face angles can be designed so that light from the top corners of the screen, where the input rays are steep, is reflected slightly toward the center of the lens to improve perceived brightness at the corners of the image. An example of an embodiment of the invention in which light from the top corners of the screen is reflected toward the center of the lens is more fully described below with reference to Table 1, Equation 2, Table 2, and FIG. 17.

Figure 8:
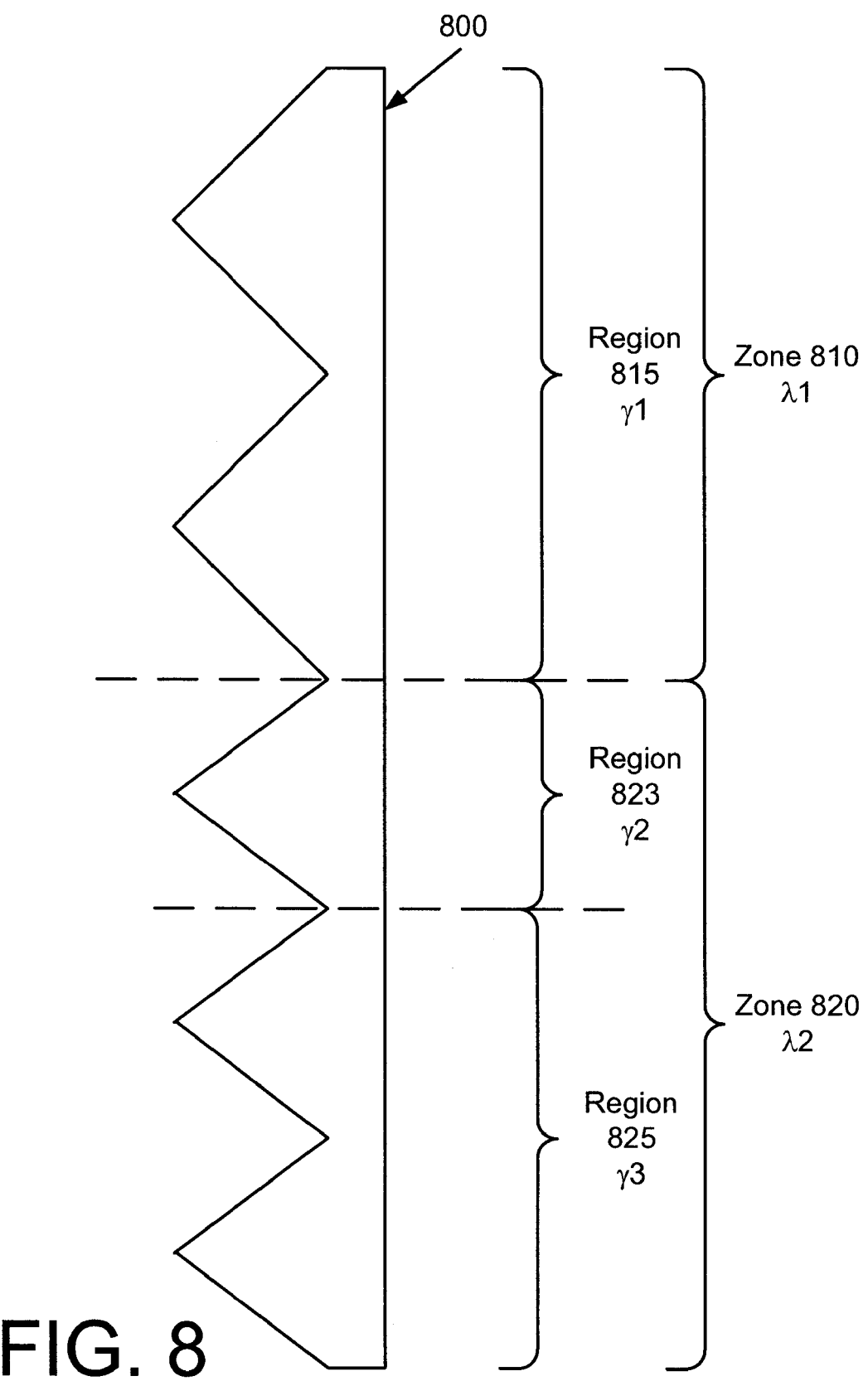
FIG. 8 illustrates a profile cross-section view of a Fresnel lens design having two zones with different groove angles and transition regions for the zones.

FIG. 8 illustrates a profile cross-section view of a Fresnel lens design having two zones with different groove angles and a transition region between the zones. Lens 800 is illustrated with only a small number of grooves, zones and regions. This is for simplicity of description. A Fresnel lens can be used that has any number of grooves, zones, and/or regions.

As used herein, a "zone" is an area of a Fresnel lens having a particular groove angle (when the groove angle is not continuously variable). A "region" is an area of a Fresnel lens in which the face angle ($\gamma$) is defined by a single equation. A zone can include multiple regions. In one embodiment, one or more transition regions are included at zone boundaries in order to provide a smooth zone transition.

In one embodiment, the equation, F, that defines the face angle, which can be a function of radius, r, for a first region and the equation, G, that defines the face angle for a second region, are equal at the region boundary. In other words, $F(r_1)=G(r_1)$ where $r_1$ is the region boundary. Further, the first derivative of the equation that defines the face angle for a region is equal to the first derivative of equation that defines the face angle at the region boundary. In other words, $F'(r_1)=G'(r_1)$ where $r_1$ is the region boundary. This requirement provides for a transition that is not seen because the change in face angle is smoothly continuous.

Figure 9:
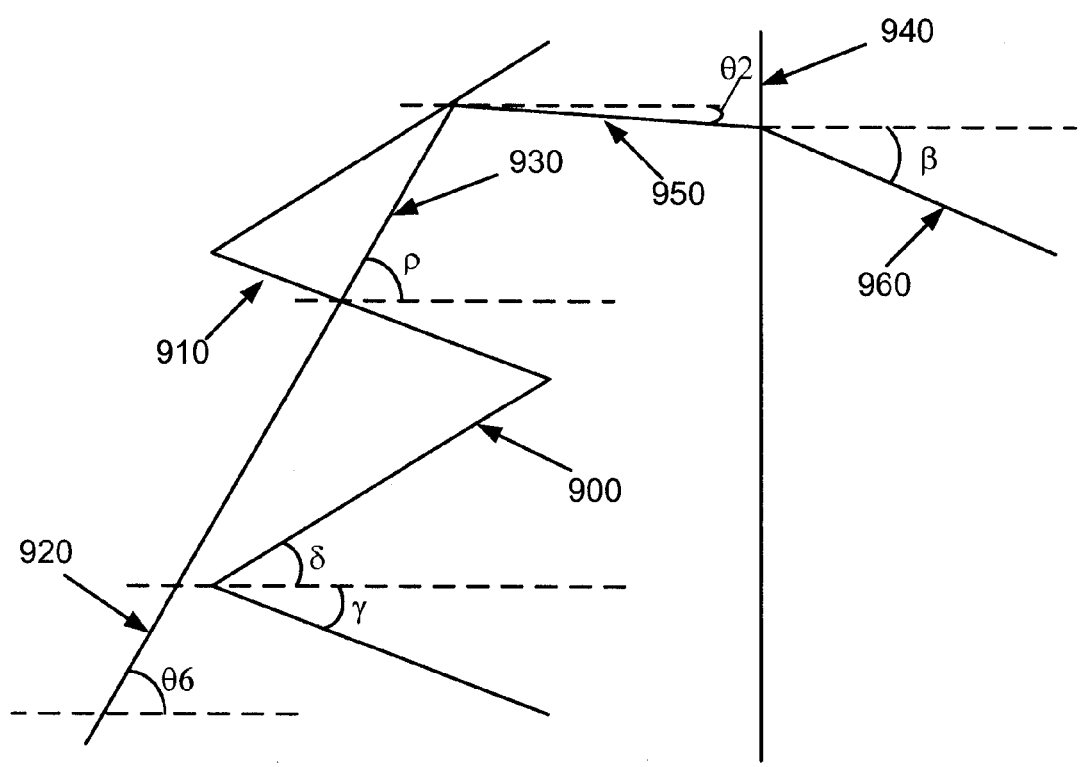
FIG. 9 illustrates a profile cross-section view of a selected portion of a Fresnel lens design.

FIG. 9 illustrates a profile cross-section view of a Fresnel lens design. In one embodiment, the following equations describe the various angles of the Fresnel lens design. Alternative angle relationships can also be used. In the equations that follow, $\theta 6$ is the input angle, or the angle of input ray 920 from horizontal; $\gamma$ is the face angle, or the angle of refraction face 910 from horizontal; $\delta$ is the reflection face angle, or the angle of reflection face 900 from horizontal; $\rho$ is the refracted ray angle, or the angle of refracted ray 930 from horizontal; θ2 is the reflected ray angle, or the angle of reflected ray 950 from horizontal; and β is the output ray angle, or the angle of output ray 960 from horizontal.

In one embodiment, the following equations are used to determine the angles to be used for various regions. For a fixed peak angle (peak angle k=γ+δ), the face angle can be calculated to create a Fresnel lens with no ghost rays near the bottom center and the face angles are modified to increase throughput.

For a two region embodiment, the inner region can be a lossless system defined by:

$$F(R,\gamma) := \left[ \begin{array}{c} \tan(\gamma) \cdot (\tan(\gamma) + 2 \cdot \tan(k-\gamma)) + \\ \dfrac{\tan\left(\dfrac{\pi}{2} - \gamma - \operatorname{asin}\left(\dfrac{\cos\left(\operatorname{atan}\left(\dfrac{R}{fl}\right) + \gamma\right)}{n}\right)\right) \cdot \tan(k-\gamma)}{\tan\left(\dfrac{\pi}{2} - \gamma - \operatorname{asin}\left(\dfrac{\cos\left(\operatorname{atan}\left(\dfrac{R}{fl}\right) + \gamma\right)}{n}\right)\right) - \tan(k-\gamma)} - \dfrac{R}{fl} \end{array} \right]$$

where n is the refractive index of the Fresnel lens material, k is the groove angle, R is the radius from the center of the Fresnel lens, and fl is the focal length of the Fresnel lens. Outer regions are defined by:

$$F2(R,\gamma) := \dfrac{\pi}{2} - \gamma - \operatorname{asin}\left(\dfrac{\cos\left(\operatorname{atan}\left(\dfrac{R}{fl}\right) + \gamma\right)}{n}\right) - 2(k-\gamma) - \theta 2$$

Figure 10:
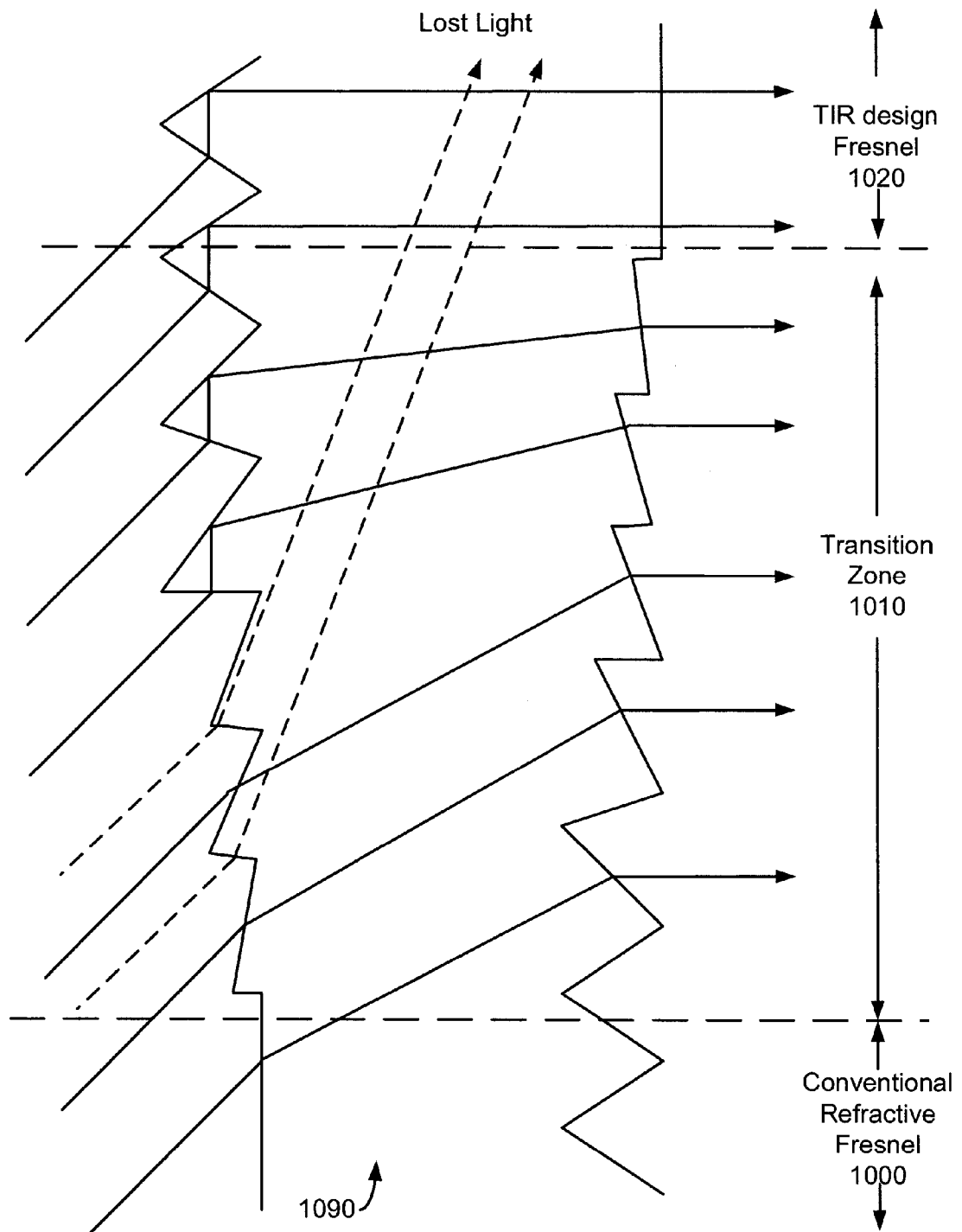
FIG. 10 illustrates one embodiment of a Fresnel lens having two zones on opposite sides of the lens with a transition region for the two zones.

FIG. 10 illustrates an embodiment of a Fresnel lens having two zones with grooves on both sides of the lens and a transition region for the two zones. Fresnel lens 1090 includes two zones: a refractive zone and a reflective zone, as well as a transition region between the two zones. In alternate embodiments, lens 1090 can have one or more zones on a single side.

In one embodiment, Fresnel lens 1090 includes an inner zone that is a conventional refractive Fresnel lens design 1000. The inner zone may include the center of lens 1090 extending outward until the outer zone becomes more efficient than the inner zone. Fresnel lens 1090 further includes an outer zone that is a total internal reflection Fresnel design 1020. The outer zone directs more light toward the viewer than if the refractive design of the inner zone were to extend to the edge of the lens.

In order to reduce, or even eliminate, discontinuities between the refractive and the reflective portions of lens 1090, transition region 1010 is included. In one embodiment, in transition region 1010, the light rays internal to Fresnel lens 1090 change gradually from the upward angle of the refractive design to the horizontal angle of the reflective design. The gradual change reduces image discontinuities due to overlapping rays.

Figure 11:
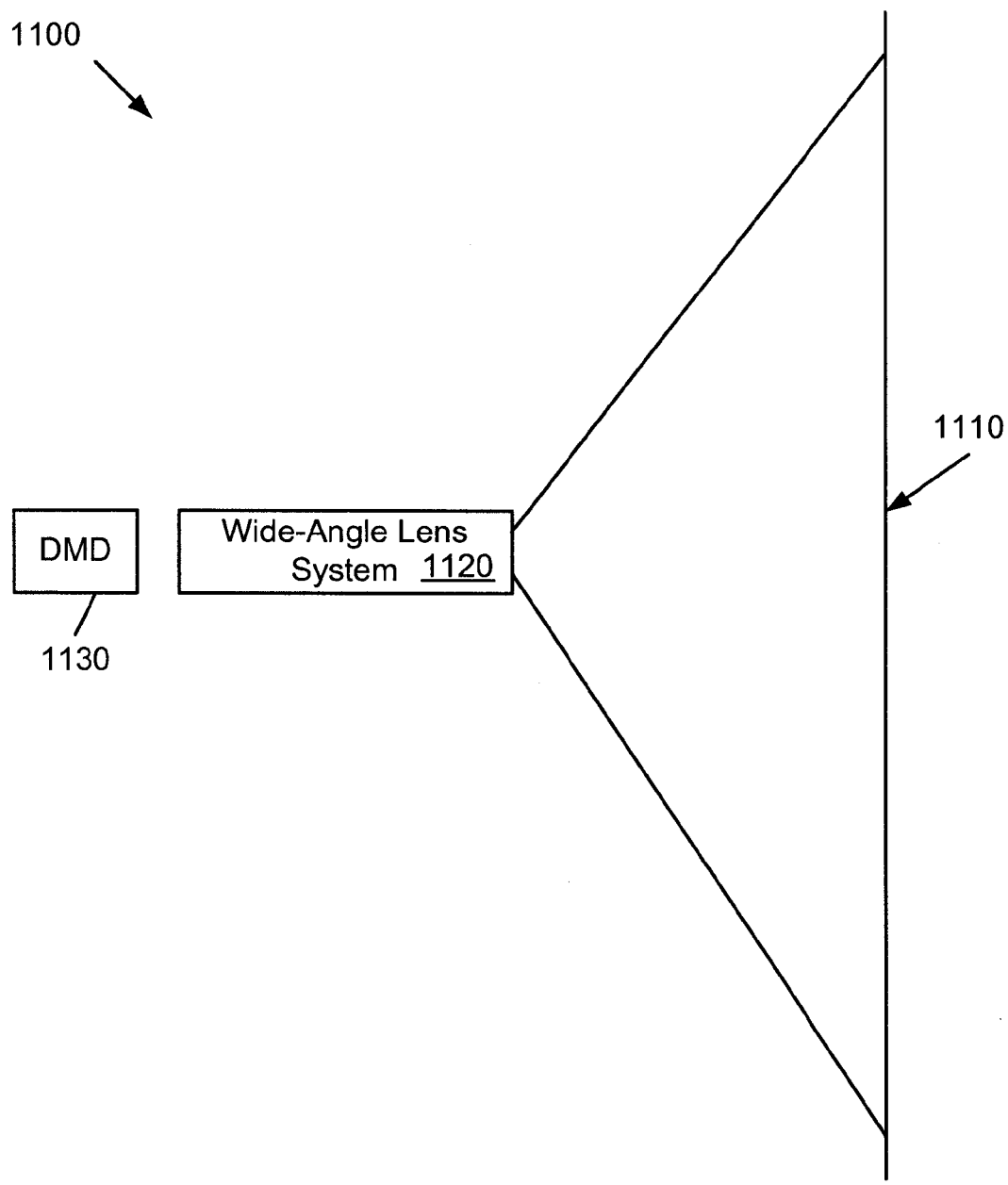
FIG. 11 illustrates one embodiment of a rear projection display device having a wide-angle lens.

FIG. 11 illustrates one embodiment of a rear projection display device having a wide-angle lens. Display device 1100 includes screen 1110, wide-angle lens system 1120 and DMD 1130. In one embodiment, screen 1110 is a Fresnel lens as described in greater detail above.

An image is provided by optical engine components (not shown in FIG. 11) that are known in the art and directed to wide-angle lens system 1120 via DMD 1130. In alternate embodiments, DMD 1130 can be replaced by other components, for example, microelectromechanical systems (MEMS), grating light valves (GLV), liquid crystal display (LCD), liquid crystal on silicon (LCOS), etc. In one embodiment, the optic axis of DMD 1130 is aligned with the optic axis of wide-angle lens system 1120 so that the full lens field is used to project the image to screen 1110. In alternate embodiments, the optic axis of DMD 130 can be offset from the optic axis of wide-angle lens system 1120. Use of a Fresnel lens as described above provides a thinner system with better brightness uniformity.

Diffusing Stray Light

Figure 12:
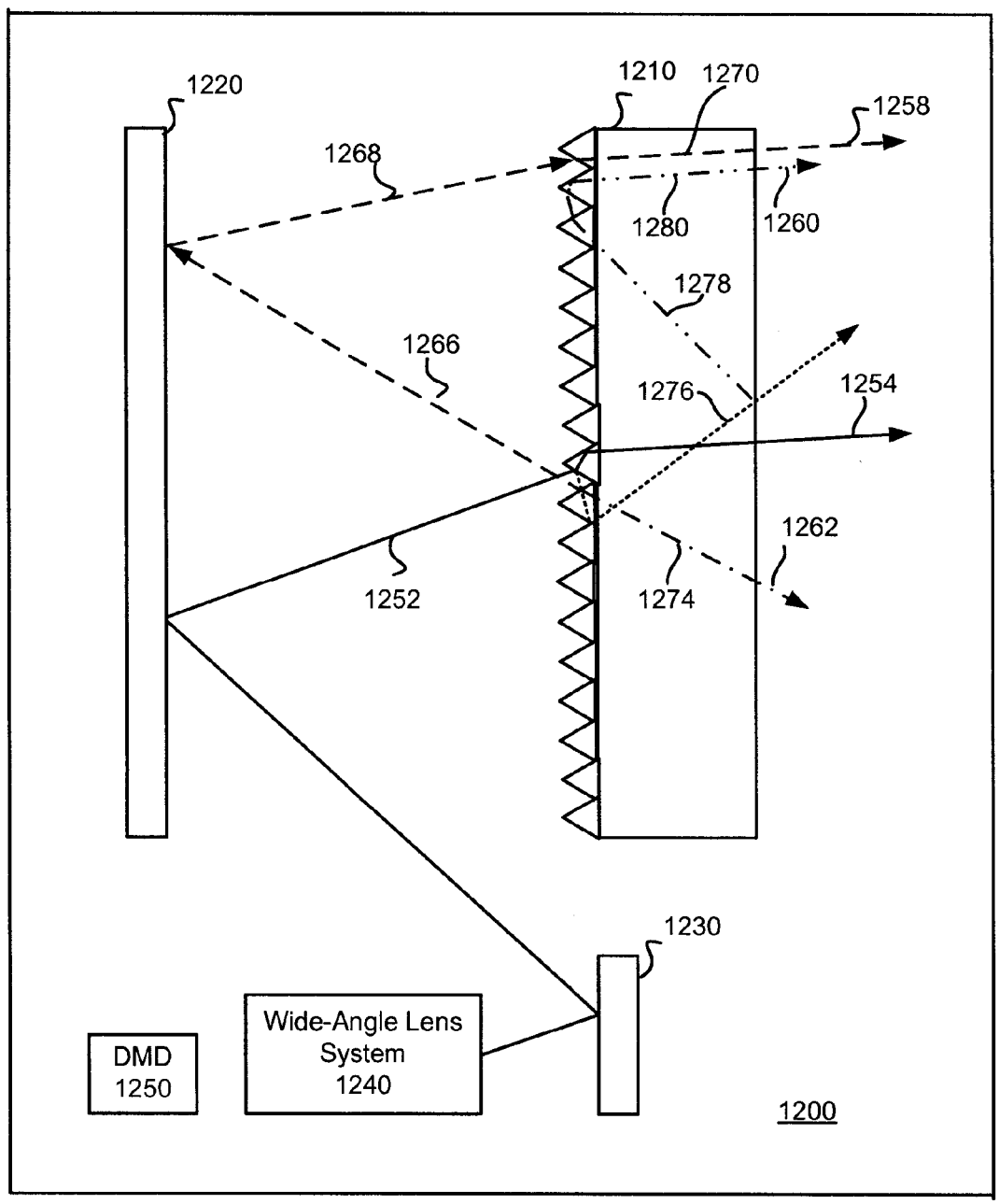
FIG. 12 illustrates rear projection display device 1200 and the potential problem of stray light.

FIG. 12 illustrates rear projection display device 1200 and the potential problem of stray light. Rear projection display device 1200 includes screen 1210, back plate mirror 1220, intermediate mirror 1230, wide-angle lens system 1240, and digital micromirror device (DMD) 1250. DMD 1250 and wide-angle lens system 1240 project an image onto intermediate mirror 1230. Intermediate mirror 1230 reflects the projected image to back plate mirror 1220. Light reflected from back plate mirror 1220 may produce a desired image (e.g., ray 1254) and an undesirable image (e.g., stray rays 1258, 1260, and 1262). For example, if light travels the path defined by reference numeral 1252, it may produce desired ray 1254.

The angular surfaces of screen 1210 (e.g., the flat output surface) act as fairly good mirrors and coherently reflect some of the light that impinges on the surfaces. Light that is coherently reflected from the angular surfaces of screen 1210 may produce objectionable stray images. For example, light may travel the path defined by reference numerals 1252, 1266, 1268, and 1270 to produce stray ray 1258. Similarly, light may travel the path defined by 1252 and 1274 to produce stray ray 1262. A third example of the path "stray light" may take is shown by reference numerals 1252, 1276, 1278, and 1280 to produce stray ray 1260. A person of ordinary skill in the art appreciates that stray images may be produced by light traveling paths other than the exemplary paths shown in FIG. 12.

Figure 13:
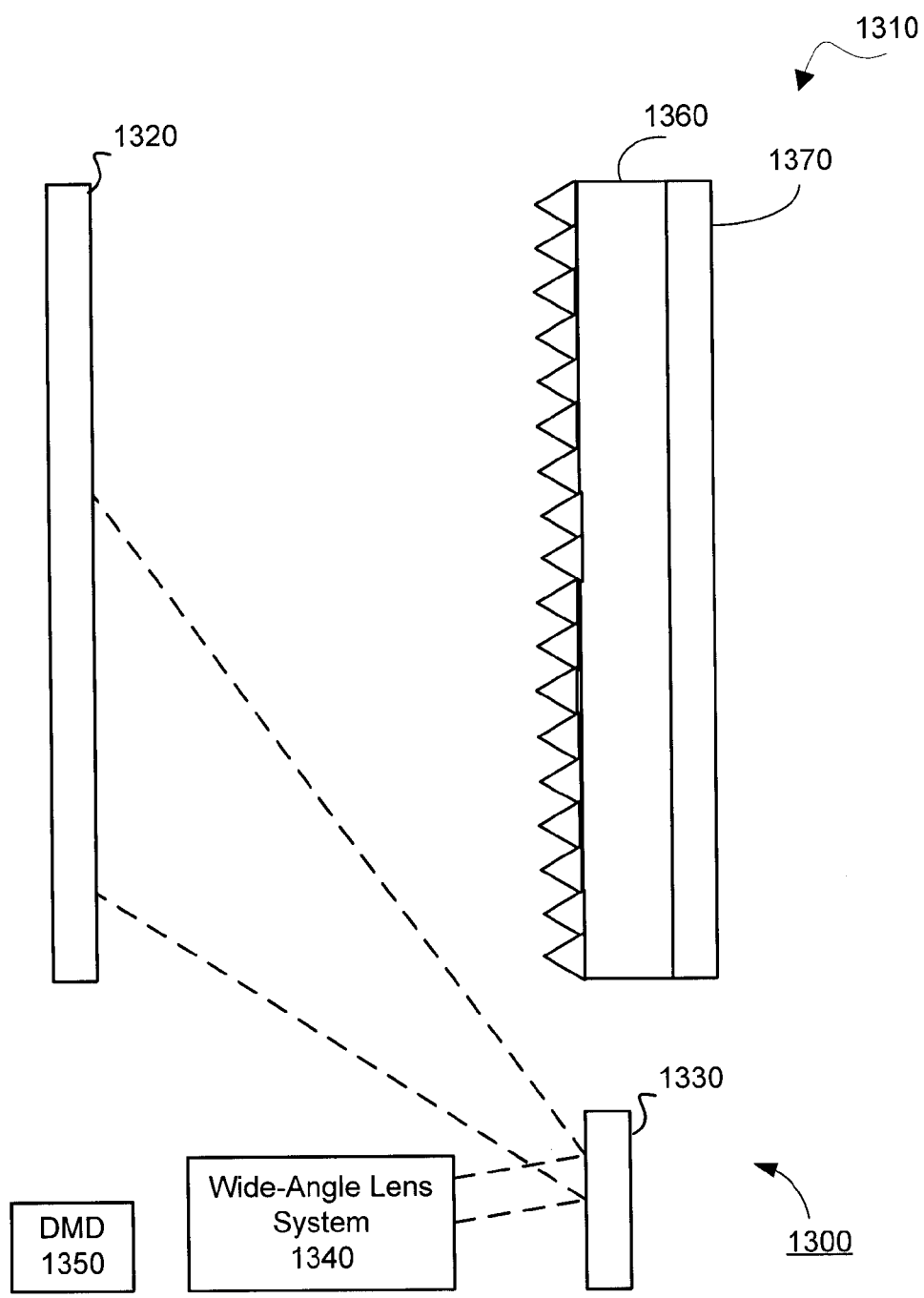
FIG. 13 illustrates rear projection display device 1300, with elements to reduce stray images.

FIG. 13 illustrates rear projection display device 1300, with elements to reduce stray images. Rear projection display device 1300 may include more components than those shown in FIG. 13 or a subset of the components shown in FIG. 13. It is not necessary, however, that all of these generally conventional components be shown in order to disclose stray light reduction.

In one embodiment, rear projection display device 1300 includes a screen 1310, a back plate mirror 1320, an intermediate mirror 1330, a wide-angle lens system 1340, and a digital micromirror device (DMD) 1350. Other components, for example, image generating components are not illustrated for reasons of simplicity of description.

The screen 1310 may be a laminate screen of unitary construction comprising a Fresnel lens 1360 and a diffusion screen 1370. The laminate screen may be formed by laminating a Fresnel lens together with a diffusion screen. In some embodiments, element 1360 may comprise microstructures that may bend or focus light instead of using a Fresnel lens. As shown in FIG. 13, Fresnel lens 1360 has a non-planar input surface and a substantially planar output surface. Diffusion screen 1370 has a substantially planar input surface and an output surface. The output surface of Fresnel lens 1360 and the input surface of diffusion screen 1370 are in facing relationship such that Fresnel lens 1360 and diffusion screen 1370 are in optical communication. For example, Fresnel lens 1360 and diffusion screen 1370 may be in intimate contact.

In some embodiments, the laminate screen may be formed by bonding the input surface of diffusion screen 1370 directly to the output surface of Fresnel lens 1360. In other embodiments, the laminate screen may include one or more intermediate lamina (not shown in FIG. 13) interposed between Fresnel lens 1360 and diffusion screen 1370. In these embodiments, the screen is formed by laminating the Fresnel lens lamina, the intermediate laminae, and the diffusion screen lamina to form the laminate. The one or more intermediate lamina may comprise an adhesive used to bond the other laminae together. Furthermore, laminate screen 1310 of the present invention may further comprise a protective screen (not shown in FIG. 13) bonded to the output surface of diffusion screen 1370. The protective screen may be configured to prevent scratches (e.g., manufactured from a material that is more scratch resistant than the material of the diffusion screen), or to preserve the cleanliness of screen 1310 (e.g., manufactured from a material better suited for application of cleaning solutions and enduring common cleaning methods).

The laminate screen 1310 provides a screen that has improved rigidity over the prior art due to the increased thickness provided by the plurality of laminae. Fresnel lenses and diffusion screens used to form screens for rear projection display devices are traditionally thin and flexible, which causes several complications to the design and assembly of the devices. Fresnel lenses and diffusion screens of greater thickness are more costly to produce than traditional thin Fresnel lenses and diffusion screens. The present invention improves the rigidity of the screens used in rear projection display devices by bonding a Fresnel lens with a diffusion screen. The Fresnel lens lamina of the present invention may be formed in any manner known in the art. In one embodiment, the Fresnel lens lamina may be formed of an acrylic or other material with sufficient UV transmission for adhesive curing. Similarly, the diffusion screen lamina may be formed in any manner known in the art. For example, the diffusion screen lamina may be formed of a polycarbonate or other extrudable material.

Additionally, diffusion screen 1370 may help to reduce stray light visibility by scattering the stray light in many different directions. The laminate structure of screen 1310 eliminates the smooth surface Fresnel lens/air interface discussed in connection with FIG. 12. The optical qualities of diffusion screen lamina 1370 may be carefully selected so that light passing through diffusion screen 1370 a single time is not significantly altered. In contrast, light passing through diffusion screen 1370 multiple times is scattered in many directions to reduce the likelihood that it will interfere with the image quality of ultra-thin rear projection display device 1300. Since diffusion screen lamina 1370 is thin and close to the image surface, stray light is diffused without significantly reducing the sharpness of a displayed image. In an exemplary embodiment, diffusion screen lamina 1370 is approximately 0.8 millimeters thick (+/−10 percent). In alternative embodiments, diffusion layer 1390 may be thinner or thicker than 0.8 millimeters and may have a different tolerance (e.g., +/−3%, +/−5%, +/−12%, +/−15%, etc.)

Fresnel lens lamina 1360 has a first index of refraction and diffusion screen lamina 1370 has a second index of refraction. In some embodiments, the diffusion screen may be configured to have a second index of refraction substantially equal to the first index of refraction of the Fresnel lens. When the laminate screen 1310 further comprises one or more intermediate lamina, the intermediate laminae may each have an index of refraction substantially equal to the first index of refraction of Fresnel lens 1360 and substantially equal to the second index of refraction of diffusion screen 1370. In some embodiments, the Fresnel lens lamina, the diffusion screen lamina, and any intermediate laminae (when present) may all have substantially similar refractive indices.

Figure 14:
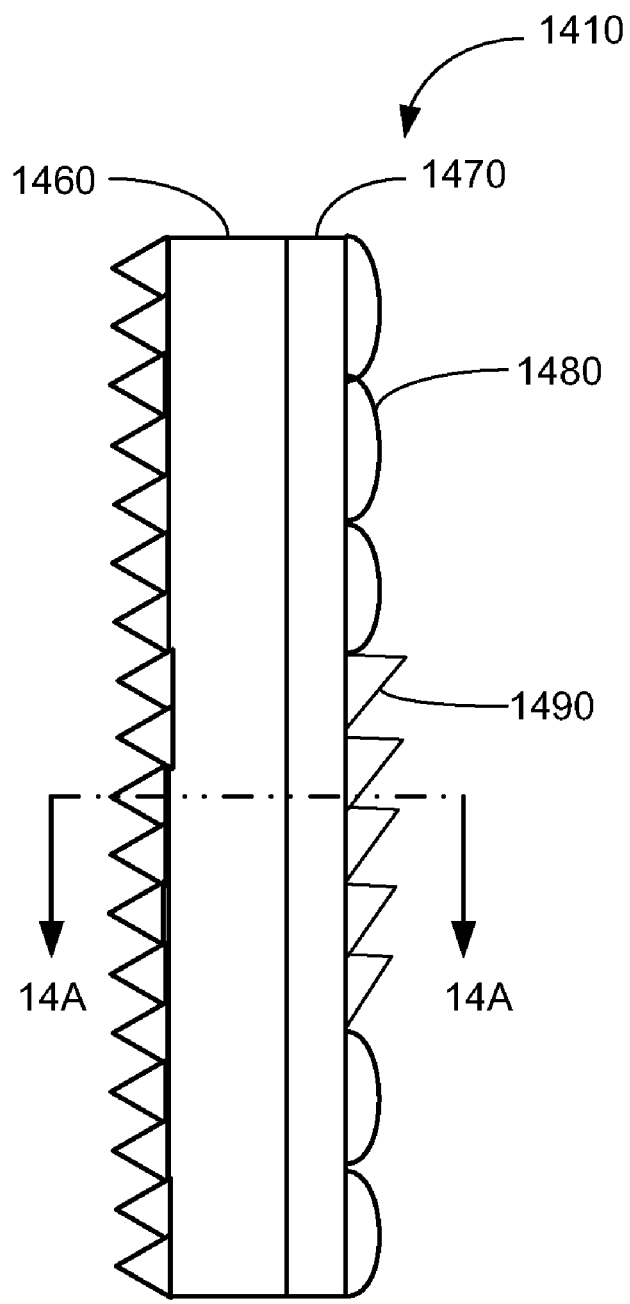
FIG. 14 illustrates an exemplary bump 1410 scattering light rather than coherently reflecting light.

FIG. 14 illustrates an alternative embodiment of laminate screen 1410. As shown in FIG. 14, the output surface of diffusion screen 1470 may be formed with a non-planar output surface. In one embodiment, the non-planar output surface of diffusion screen 1470 may comprise a plurality of lenses, such as linear lens or lenticular lenses. In another embodiment, the output surface of diffusion screen 1470 may comprise a plurality of prisms. In yet another embodiment, as shown in FIG. 14, the output surface may comprise a plurality of lenses 1480 and a plurality of prisms 1490.

Ghost images caused by stray light and dark zones are common in conventional screens used in rear projection display devices. The non-planar output surface of diffusion screen 1470 may reduce the occurrence of ghost images and dark zones in rear projection display devices by diffusing the stray light that causes ghost images and by redirecting light in the dark zones for better viewing. Lenses 1480 may be configured to diffuse stray light and will be discussed in relation to FIG. 15 below. Prisms 1490 may be configured to redirect light in the dark zone for better viewing. In some regions of screen 1410, light exiting Fresnel lens 1460 may be directed downward away from a viewer (not shown). Downwardly directed lightrays that pass through prisms 1490 will be redirected towards the viewer reducing the dark zone effect. In some embodiments, microstructures 1462 shown in FIG. 14A, discussed below, may be used to bend or focus light as opposed to using a Fresnel lens 1460.

Figure 15:
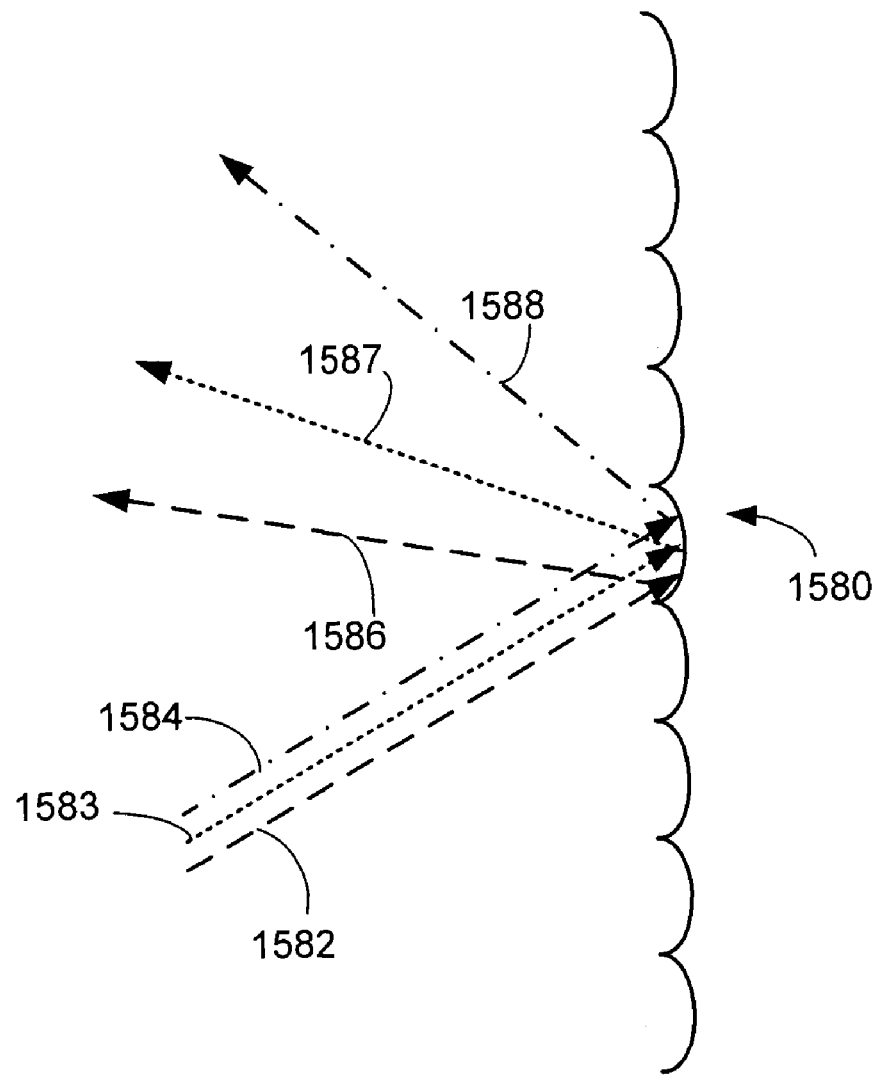
FIG. 15 illustrates an exemplary diffusion layer 1510 diffusing light that might otherwise form a stray image.

FIG. 15 illustrates an exemplary lens 1580 scattering light rather than coherently reflecting light. Rays 1582, 1583, and 1584 are substantially parallel to each other and impinge on lens 1580. If rays 1582, 1583, and 1584 impinge on a flat surface they may be reflected coherently with respect to one another and are more likely, therefore, to create a stray image. Since the surface of lens 1580 is curved, however, each ray has a different angle of incidence with respect to lens 1580. Therefore, lens 1580 scatters rays 1582, 1583, and 1584. Rays 1586, 1587, and 1588 illustrate the scattering effect of lens 1580.

Figure 14A:
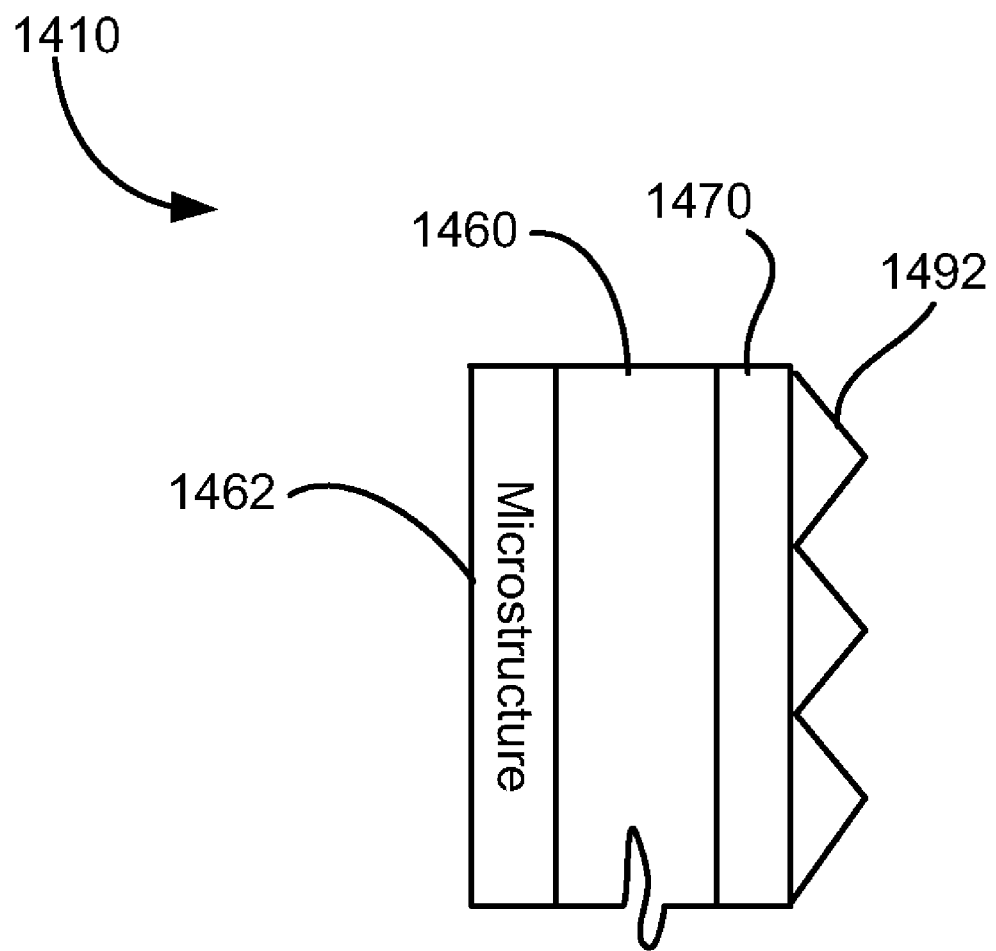
FIG. 14A illustrates a schematic illustration of a section of a laminate screen.

The lenses 1480 and prisms 1490 need not be in the arrangement shown in FIG. 14. The lenses and prisms are disposed on the diffusion screen 1470 to accomplish the desired effect of reducing ghost images and dark zones. For example, lenses 1480 can be of varying shapes and sizes. Additionally, prisms 1490 may be of varying sizes and slopes. The non-planar output surface of the diffusion screen lamina may be formed with a surface topography of continuous cross section, such as by linear lens or prisms. Additionally, the non-planar output surface may be formed with a surface topography such that the cross section is dependent on a third axis, such as by pyramids 1492 or bumps. FIG. 14A illustrates a cross-section taken at, for example, the line 14A-14A in FIG. 14 showing a third axis view, and another possible example output surface topography of a diffusion screen lamina that may include a plurality of pyramids 1492 disposed on a diffusion screen 1470. FIG. 14A also illustrates an example microstructure lamina having a non-planar input surface 1462. These surface topographies may be used alone or in combination with other suitable surface topographies. One of ordinary skill in the art would recognize that changes to the arrangement, shape, and size of the prisms 1490 and lenses 1480 will affect the resultant image quality. Preferred shapes, sizes, and arrangements will be determined by the nature of the display device, the Fresnel lens, and the diffusion screen with which the lenses 1480 and prisms 1490 are used. However, in some embodiments, a diffusion screen with lenses 1480 in a center region and prisms 1490 in a lower region may be preferred.

In order to reduce, or even eliminate, discontinuities between lenses 1480 and prisms 1490 of diffusion screen 1470, a transition region may be provided. The transition region may be formed in a variety of manners. For example, the transition could be gradual. In a gradual transition from lenses to prisms, a single prism could be inserted amongst lenses, followed by two prisms amongst fewer lenses, followed by three prisms amongst even fewer lenses, etc. until the transition is complete. In another embodiment, the transition may be overlapping in nature. In an overlapping transition from prisms to lens, small lenses may be formed on the surface of a prism. The transition progresses by increasing the radius of the lenses on the prisms while decreasing the slope of the prism until it is flat.

Exemplary Fresnel Equation

Figure 16:
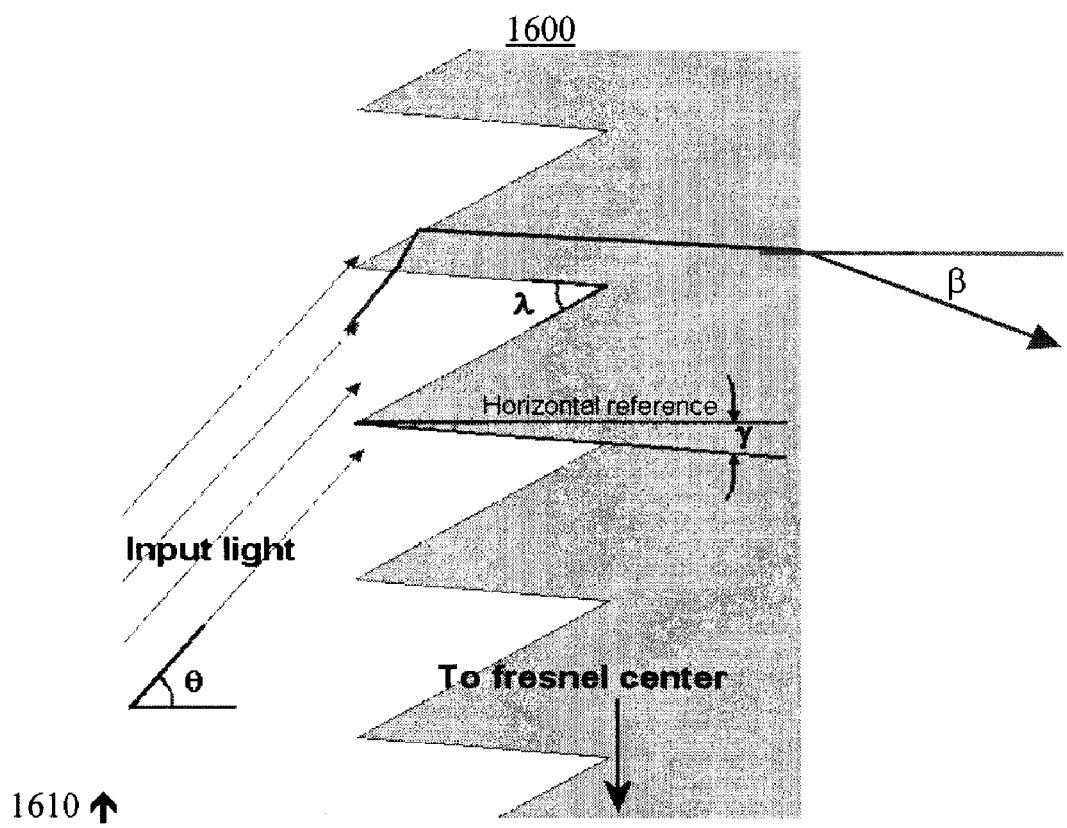
FIG. 16 illustrates the relationship between face angle ($\gamma$) and output ray angle ($\beta$), according to an embodiment of the invention.

FIG. 16 illustrates the relationship between face angle ($\gamma$) and output ray angle ($\beta$), according to an embodiment of the invention. As shown in FIG. 16, input light 1610 reaches Fresnel lens 1600 with an input ray angle theta ($\theta$). The groove angle for the illustrated zone of Fresnel lens 1600 is shown by angle lambda ($\lambda$). As previously discussed in connection with FIG. 6a through FIG. 8, Fresnel lens 1600 may have more than one zone and each zone may have a different groove angle. The various zones of Fresnel lens 1600 may be defined by distances (R) from the center of the Fresnel lens (e.g., the center of Fresnel lens 600, shown in FIG. 6a). Table 1 provides a zone equation for the illustrated embodiment of the invention. The zone equation expresses face angle ($\gamma$) in terms of the refraction angle, output ray angle ($\beta$), and groove angle ($\lambda$).

TABLE 1

First zone

| | |
|---|---|
| Minimum radius | R = 245 |
| Maximum radius | R = 1230 |
| Zone equation | $\gamma = \tan^{-1}\left(\dfrac{n\sin\{\beta' + \lambda\} + \sin(\theta + \lambda)}{n\cos\{\beta' + \lambda\} - \cos(\theta + \lambda)}\right) + \lambda - \dfrac{\pi}{2}$ |
| Equation coefficients | n = 1.55<br>$\beta' = \sin^{-1}(\sin \beta/n)$ |
| Groove angle ($\lambda$) | 38° |

Equation 2 describes how output ray angle ($\beta$) varies with the radial distance R, in an embodiment of the invention. Equation 2 is expressed as a spline equation. Spline equations are well known to those of ordinary skill in the art.

$$\beta = \beta_1 + \sum_{k=1}^{4} \Delta_k \left[\left\{1 + \left(1 + \dfrac{R - R_0}{R_5 - R_0} - \dfrac{R_k - R_0}{R_5 - R_0}\right)^m\right\}^{\frac{1}{m}} - 1\right], \quad \text{Equation 2}$$

where $$\Delta_1 = \dfrac{\beta_2 - \beta_1}{\dfrac{R_2 - R_0}{R_5 - R_0} - \dfrac{R_1 - R_0}{R_5 - R_0}}$$

and $$\Delta_k = \dfrac{\beta_{k+1} - \beta_k}{\dfrac{R_{k+1} - R_0}{R_5 - R_0} - \dfrac{R_k - R_0}{R_5 - R_0}} - \dfrac{\beta_k - \beta_{k-1}}{\dfrac{R_k - R_0}{R_5 - R_0} - \dfrac{R_{k-1} - R_0}{R_5 - R_0}}.$$

Table 2 provides the coefficients for equation 2 in an exemplary embodiment of the invention where m is 16 and $R_0$ is 230 millimeters.

TABLE 2

| | k | | | | |
|---|---|---|---|---|---|
| | 1 | 2 | 3 | 4 | 5 |
| R [mm] | 260 | 300 | 650 | 950 | 1232 |
| $\beta$ [°] | 0 | 0 | 0 | 5.5 | 8.5 |

Figure 17:
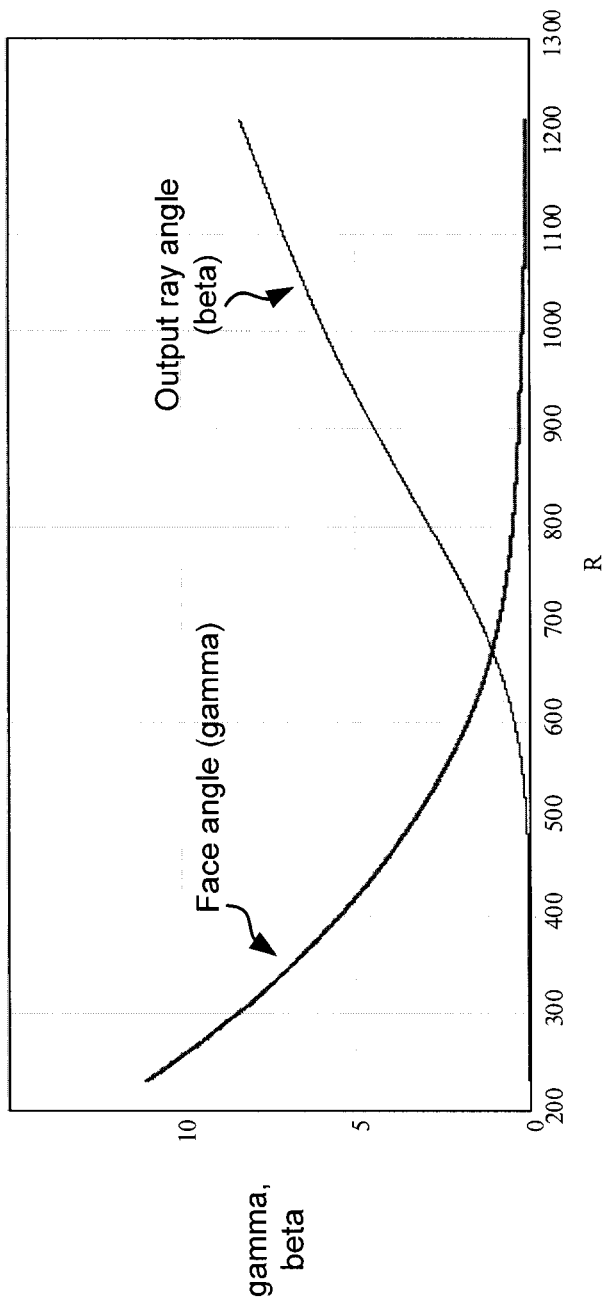
FIG. 17 provides an exemplary illustration of face angle (γ) and output ray angle (β) varying as a function of radial distance from the center of a Fresnel lens, according to an embodiment of the invention.

FIG. 17 provides an exemplary illustration of face angle ($\gamma$) and output ray angle ($\beta$) varying as a function of radial distance (R) from the center of a Fresnel lens, according to an embodiment of the invention. As illustrated in FIG. 17, face angle ($\gamma$) is nonzero in a region close to the center of the Fresnel lens and approaches zero as the radial distance from the center of the Fresnel lens increases. In contrast, output ray angle ($\beta$) is nearly zero for small values of the radial distance R and increases as the value of R increases. Thus, in the illustrated embodiment output ray angle ($\beta$) is substantially close to zero (e.g., +/−10°) for values of R corresponding to the center of the Fresnel lens and increases for values of R corresponding to the corners of the Fresnel lens. In alternative embodiments, the relationships between face angle ($\gamma$), output ray angle ($\beta$), and radial distance from the center of a Fresnel lens (R) may be different than those illustrated in FIG. 17.

Figure 18:
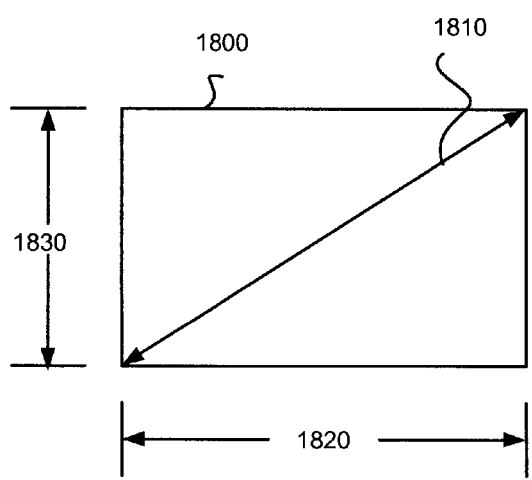
FIG. 18 is a front view of screen 1800.

The Relationship Between the Screen Diagonal Length and the Focal Distance of the Fresnel Lens FIG. 18 is a front view of screen 1800. Reference numeral 1810 illustrates the screen diagonal of screen 1800. Screen diagonal refers to the distance from one corner of screen 1800 to the opposite corner of the screen. In an embodiment, the term screen diagonal refers to the diagonal length of the viewable portion of screen 1800. In an alternative embodiment, the term screen diagonal refers to the diagonal length of the actual size of screen 1800. Screen 1800 is a Fresnel lens, in an embodiment of the invention.

Reference numerals 1820 and 1830, respectively, illustrate the width and height of screen 1800. The ratio of width 1820 to height 1830 defines the aspect ratio of screen 1800. In an embodiment, the aspect ratio of screen 1800 is 16:9. In an alternative embodiment, the aspect ratio of screen 1800 is 4:3. Screen 1800 may have an aspect ratio other than 16:9 and 4:3.

Figure 19:
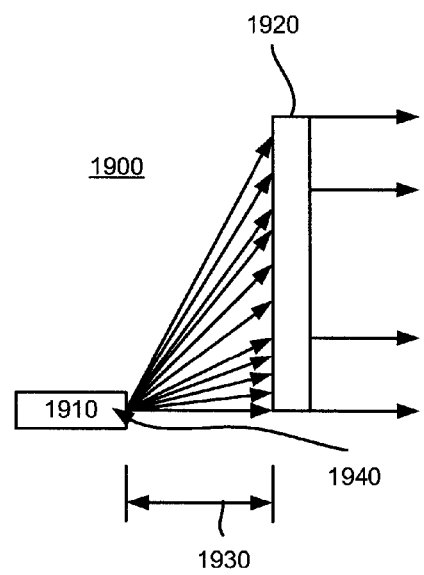
FIG. 19 illustrates rear projection display device 1900.

FIG. 19 illustrates rear projection display device 1900. Rear projection display device 1900 includes wide-angle lens system 1910 and screen 1920. In an embodiment, screen 1920 is a Fresnel lens. Focal distance 1930 represents the focal length of Fresnel lens 1920. The term focal length refers to the distance from the optical center of Fresnel lens 1920 to focal point 1940. The term focal point may refer to the spot at which impinging rays converge to a common point or focus. Aberrated rays may also form a focal point. The term "circle of least confusion" refers to a focal point formed by aberrated rays. The focal point is usually placed near the pupil of a projection lens (e.g, the pupil of the projection lens of wide-angle lens system 1910.

Focal distance 1930 may be used to express the thinness of rear projection display device 1900. For example, the thinness of rear projection display device 1900 may be expressed by the ratio of the screen diagonal of Fresnel lens 1920 to focal distance 1930. In an embodiment in which the screen diagonal is 60 inches, the ratio of the screen diagonal to focal distance 1930 is approximately 3.0. In an alternative embodiment of the invention in which the screen diagonal is 70 inches, the ratio of screen diagonal to Fresnel focal distance is approximately 4.1. The term "approximately equal to" refers to a value that is within ten percent of the provided value.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

We claim as follows:

1. A rear projection display device, comprising:
    a laminate screen of unitary construction comprising:
    a microstructure lamina having a non-planar input surface, a substantially planar output surface and a first index of refraction; and
    a diffusion screen lamina having a substantially planar input surface, an output surface and a second index of refraction;
    wherein the diffusion screen lamina is in intimate contact with the microstructure lamina; and wherein the planar output surface of the microstructure lamina and the planar input surface of the diffusion screen lamina are in facing relationship.

2. The display device of claim 1, wherein the output surface of the microstructure lamina is bonded directly to the input surface of the diffusion screen lamina.

3. The display device of claim 1, further comprising at least one intermediate lamina interposed between the microstructure lamina and the diffusion screen lamina.

4. The display device of claim 3, wherein the at least one intermediate lamina comprises an adhesive.

5. The display device of claim 1, wherein the laminate screen further comprises a protective screen lamina bonded to the diffusion screen lamina output surface.

6. The display device of claim 1, wherein the output surface of the diffusion screen lamina is non-planar.

7. The display device of claim 6, wherein the output surface of the diffusion screen lamina comprises a plurality of lenses.

8. The display device of claim 7, wherein the plurality of lenses comprise linear lenses.

9. The display device of claim 6, wherein the output surface of the diffusion screen lamina comprises a plurality of prisms.

10. The display device of claim 6, wherein the output surface of the diffusion screen lamina comprises a plurality of pyramids.

11. The display device of claim 6, wherein the output surface of the diffusion screen lamina comprises a plurality of prisms and a plurality of linear lenses.

12. The display device of claim 6, wherein the output surface of the diffusion screen lamina comprises a plurality of pyramids and a plurality of lenses.

13. A screen for use in rear projection display devices, comprising:
    a microstructure lamina having a non-planar input surface and a substantially planar output surface and having a first index of refraction; and
    a diffusion screen lamina having a substantially planar input surface and an output surface and having a second index of refraction;
    wherein the diffusion screen is in intimate contact with the microstructure lamina;
    and wherein the planar output surface of the microstructure lamina and the planar input surface of the diffusion screen lamina are in facing relationship to form a laminate screen of unitary construction.

14. The screen of claim 13, wherein the output surface of the microstructure lamina is bonded directly to the input surface of the diffusion screen lamina.

15. The screen of claim 13, further comprising at least one intermediate lamina interposed between the microstructure lamina and the diffusion screen lamina.

16. The screen of claim 13, wherein the laminate screen further comprises a protective screen lamina bonded to the diffusion screen lamina output surface.

17. The screen of claim 13, wherein the output surface of the diffusion screen lamina comprises a plurality of lenses.

18. The screen of claim 17, wherein the plurality of lenses comprise linear lenses.

19. The screen of claim 13, wherein the output surface of the diffusion screen lamina comprises a plurality of prisms.

20. The screen of claim 13 wherein the output surface of the diffusion screen lamina comprises a plurality of pyramids.

21. The screen of claim 13, wherein the output surface of the diffusion screen lamina comprises a plurality of prisms and a plurality of linear lenses.

22. The screen of claim 13, wherein the output surface of the diffusion screen lamina comprises a plurality of pyramids and a plurality of lenses.

* * * * *